(12) United States Patent
Wakizaka

(10) Patent No.: US 8,521,088 B2
(45) Date of Patent: Aug. 27, 2013

(54) COMMUNICATION APPARATUS AND COMMUNICATION SYSTEM

(75) Inventor: Masaaki Wakizaka, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 889 days.

(21) Appl. No.: 12/036,973

(22) Filed: Feb. 25, 2008

(65) Prior Publication Data

US 2008/0207132 A1 Aug. 28, 2008

(30) Foreign Application Priority Data

Feb. 27, 2007 (JP) ................................. 2007-046496

(51) Int. Cl.
*H04B 15/00* (2006.01)

(52) U.S. Cl.
USPC .......................................... 455/63.1; 455/501

(58) Field of Classification Search
USPC ................................. 455/63.1, 501
See application file for complete search history.

(56) References Cited

U.S. PATENT DOCUMENTS

| | | | | |
|---|---|---|---|---|
| 2002/0071407 A1* | 6/2002 | Koo et al. | ...................... | 370/335 |
| 2002/0071421 A1* | 6/2002 | Chiu et al. | ...................... | 370/349 |
| 2002/0194609 A1* | 12/2002 | Tran | ................ | 725/95 |
| 2004/0116150 A1* | 6/2004 | Yukie et al. | ................ | 455/550.1 |
| 2004/0192308 A1* | 9/2004 | Lee et al. | ...................... | 455/436 |
| 2004/0228273 A1* | 11/2004 | Kurobe et al. | ................ | 370/229 |
| 2004/0240526 A1* | 12/2004 | Schmandt et al. | ............ | 375/135 |
| 2004/0246925 A1* | 12/2004 | Wang | ................ | 370/332 |
| 2005/0141463 A1* | 6/2005 | Ando | ............................ | 370/335 |
| 2006/0013156 A1* | 1/2006 | Miyoshi et al. | ............... | 370/328 |
| 2006/0084475 A1* | 4/2006 | Ohkubo et al. | ............ | 455/562.1 |
| 2006/0123324 A1* | 6/2006 | Cudak et al. | ................... | 714/776 |
| 2006/0143439 A1* | 6/2006 | Arumugam et al. | .......... | 713/153 |
| 2006/0153155 A1* | 7/2006 | Jacobsen et al. | .............. | 370/338 |
| 2006/0220785 A1* | 10/2006 | Ferdman | ...................... | 340/5.61 |
| 2006/0229021 A1* | 10/2006 | Nakao | .............................. | 455/68 |
| 2006/0240794 A1* | 10/2006 | Cozzo et al. | ................... | 455/295 |
| 2006/0258291 A1* | 11/2006 | Nakata et al. | ............... | 455/67.11 |
| 2007/0041350 A1* | 2/2007 | Famolari | ........................ | 370/338 |
| 2007/0105548 A1* | 5/2007 | Mohan et al. | ............... | 455/426.1 |
| 2007/0124626 A1* | 5/2007 | Lee et al. | ........................ | 714/704 |
| 2007/0183392 A1* | 8/2007 | Tandai et al. | ................. | 370/350 |
| 2008/0022180 A1* | 1/2008 | Kuo | ............... | 714/748 |
| 2009/0119565 A1* | 5/2009 | Park et al. | ...................... | 714/748 |

FOREIGN PATENT DOCUMENTS

| | | |
|---|---|---|
| JP | H06-224837 A | 8/1994 |
| JP | H11-341534 A | 12/1999 |

* cited by examiner

*Primary Examiner* — Nay A Maung
*Assistant Examiner* — Erica Fleming-Hall
(74) *Attorney, Agent, or Firm* — Baker Botts L.L.P.

(57) ABSTRACT

There is disclosed a communication apparatus which wirelessly communicates information with a first other communication apparatus by a first communication method and using a second frequency band which is at least partially overlapping a first frequency band usable according to the first communication method. The communication apparatus includes a first communicator which implements the wireless information communication with the first other communication apparatus by the first communication method, and a requestor which requests the first other communication apparatus, where at least there is a possibility that a field strength of an external radio wave in the second frequency band is equal to or larger than a predetermined threshold, to increase the number of times the first other communication apparatus sends information when making the wireless information communication with the communication apparatus using the second frequency band, as compared to where there is not the possibility.

10 Claims, 8 Drawing Sheets

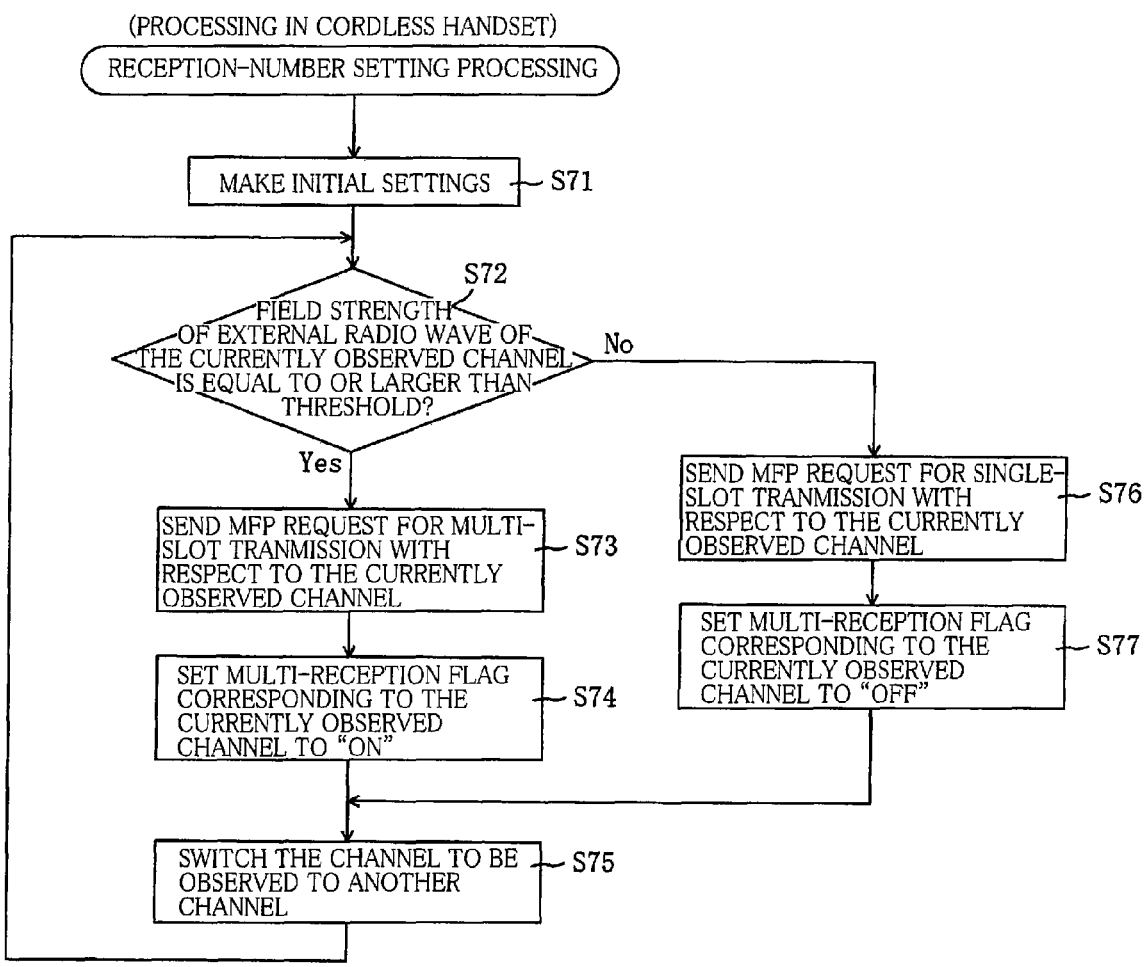

COMMUNICATION APPARATUS AND COMMUNICATION SYSTEM

CROSS REFERENCE TO RELATED APPLICATION

The present application claims priority from Japanese Patent Application No. 2007-46496, which was filed on Feb. 27, 2007, the disclosure of which is herein incorporated by reference in its entity.

BACKGROUND OF THE INVENTION

1. Field of the Invention

The present invention relates to a communication apparatus that makes a wireless communication by a communication method, and particularly to a communication apparatus that can maintain an excellent communication quality in a wireless communication even when the wireless communication is subjected to interference by an external radio wave.

2. Description of Related Art

There are known communication apparatuses capable of wirelessly communicating information or data by various methods that use respective frequency bands, which in some cases overlap with one another.

When such overlapping of the frequency bands used in the wireless communications made by the communication apparatuses occurs, the wireless communications interfere with one another, inviting an increase in a transfer error rate of each wireless communication. In particular, when the transfer error rate is thus increased in a communication made by a communication apparatus that wirelessly communicates audio data, such as digital cordless telephone and radio communication equipment, there arises a problem that the audio quality deteriorates.

To deal with the problem, JP-A-6-224837 (see paragraph [0012] of JP-A-6-224837) proposes a mobile wireless telephone system in which a transmitting unit sends same audio data repeatedly a plurality of times, and a receiving unit selects a non-erroneous one of a received plurality of pieces of the same audio data, and converts the selected piece of the audio data into an audio signal, which is outputted or played.

The mobile wireless telephone system can decrease the transfer error rate and accordingly maintain an excellent communication or audio quality. However, the receiving unit should repeatedly implement a same reception processing for all the pieces of the audio data, consuming a lot of electricity.

In view of this, JP-A-11-341534 (see paragraph [0019] of JP-A-11-341534) proposes a paging receiver that receives information in units of subframes and detects an error in received information subframe by subframe. When any error is not found or detected in a subframe, the subframe is received. The subframe reception of which is thus complete will not be received again. More specifically, when the "self-frame" is received by the paging receiver the next and following times, a processing of receiving the subframe is not implemented, thereby reducing the power consumption.

However, the paging receiver should implement a processing of detecting an error for every subframe, thereby making the processing in the paging receiver to receive information relatively complex as a whole.

SUMMARY OF THE INVENTION

This invention has been developed in view of the above-described situations, and it is an object of the invention, therefore, to provide a communication apparatus and a communication system which can decrease the transfer error rate with a simple processing while saving power.

To attain the above object, the invention provides a communication apparatus which wirelessly communicates information with a first other communication apparatus by a first communication method and using a second frequency band which is at least partially overlapping a first frequency band usable according to the first communication method. The communication apparatus includes (a) a first communicator which implements the wireless information communication with the first other communication apparatus by the first communication method, and (b) a requestor which requests the first other communication apparatus, where at least there is a possibility that a field strength of an external radio wave in the second frequency band is equal to or larger than a predetermined threshold, to increase the number of times the first other communication apparatus sends information when making the wireless information communication with the communication apparatus using the second frequency band, as compared to where there is not the possibility.

According to the communication apparatus, the first communicator wirelessly communicates with the first other communication apparatus, using the second frequency band, and by the first communication method according to which a first frequency band is used. At least a part of the second frequency band overlaps the first frequency band.

Where there is a possibility that the field strength of the external radio wave in the second frequency band is equal to or larger than the predetermined threshold, the requestor requests the first other communication apparatus to increase the number of times the first other communication apparatus sends the communication apparatus information through, or using, the second frequency band, as compared to where there is not such a possibility.

That is, when the field strength of the external radio wave in the second frequency band is equal to or larger than the threshold, there is a risk of increase in a transfer error rate of the wireless communication made between the first communicator and the first other communication apparatus through the second frequency band, due to interference by the external radio wave, which results in degradation in the communication quality.

According to the communication apparatus of the invention, however, when making a wireless communication with the first other communication apparatus using the second frequency band, the communication apparatus receives information from the first other communication apparatus repeatedly a number of times that is larger than that in the case where there is not the above-described possibility, as a result of the request made by the requester. Thus, even when situated in an environment where the communication quality might otherwise degrade due to the interference with the external radio wave, the communication apparatus can maintain an excellent communication quality.

On the other hand, where there is not the possibility that the field strength of the external radio wave is equal to or larger than the threshold, in other words, where there is not a possibility that the external radio wave interferes with the wireless communication made between the communication apparatus and the first other communication apparatus using the second frequency band, the number of times the first other communication apparatus sends information is made relatively small, thereby enabling to save power while maintaining an excellent communication quality.

According to a first preferable form of the communication apparatus, the requestor includes a field-strength measuring portion for measuring the field strength of the external radio wave in the second frequency band, and requests the first other communication apparatus, where the field strength measured by the field-strength measuring portion is equal to or larger than the predetermined threshold, to increase the number of times as compared to where the field strength measured is smaller than the predetermined threshold.

In the communication apparatus of the first preferable form, the request to increase the number of times is made on the basis of the measurement of the field strength of the external radio wave. Thus, without making complex the processing to receive the information, the excellent communication quality can be maintained while power is saved, with stability.

According to a second preferable form of the communication apparatus, the communication apparatus further includes a second communicator which wirelessly communicates information with a second other communication apparatus, which is different from the first other communication apparatus, by a second communication method according to which the second frequency band is usable, and the requestor requests the first other communication apparatus, while the second communicator is held in a state capable of making the wireless communication with the second other communication apparatus, to increase the number of times as compared to while the second communicator is not held in the state.

In the communication apparatus of the second preferable form, the first communicator makes a wireless communication with the first other communication apparatus by the first communication method according to which the first frequency band is usable, and the second communicator makes a wireless communication with the second other communication apparatus by the second communication method according to which the second frequency band is usable, with the second frequency band at least partially overlapping the first frequency band.

While the second communicator is held in the state capable of making the wireless communication, the communication apparatus determines that there is the possibility that the field strength of the external radio wave in the second frequency band is equal to or larger than the threshold, and thus the requestor requests the first other communication apparatus to increase the number of times the first other communication apparatus wirelessly sends information through or using the first frequency band as compared to while the second communicator is not held in the state capable of making the wireless communication. Thus, while the second communicator is held in the state capable of making the wireless communication, the first other communication apparatus sends information the increased number of times.

The second frequency band, through which the second communicator makes the wireless communication, at least partially overlaps the first frequency band through which the first communicator makes the wireless communication. Hence, while the second communicator is held in the state capable of making the wireless communication, the wireless communication made by the first communicator through or using the first frequency band might interfere with the wireless communication made by the second communicator through or using the second frequency band, which results in degradation in the communication quality of the wireless communication made by the first communicator.

According to the communication apparatus of the second preferable form, however, while the second communicator is in the state capable of making the wireless communication, the first other communication apparatus sends information the increased number of times in the wireless communication between the first communicator and the first other communication apparatus, as a result of the request made by the requester. Thus, even in an environment where the communication quality of the wireless communication made by the first communicator might otherwise degrade due to the interference with the wireless communication made by the second communicator, the excellent communication quality of the wireless communication made by the first communicator can be maintained.

On the other hand, while the second communicator is not held in the state capable of making the wireless communication, the number of times the first other communication apparatus sends information is not increased. That is, where there is not the possibility that the wireless communication made by the second communicator interfere with the wireless communication made by the first communicator, the number of times is not unnecessarily increased, thereby saving power.

The processing to maintain the excellent communication quality while saving power is implemented on the basis of whether the second communicator is held in the state capable of making the wireless communication or not. Hence, it is enabled to maintain the excellent communication quality while saving power, without making complex the processing to receive information.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which:

FIG. 7 is a flowchart illustrating a reception-number setting processing implemented in the cordless handset.

DETAILED DESCRIPTION OF PREFERRED EMBODIMENTS

Hereinafter, there will be described one presently preferred embodiment of the invention, by referring to the accompanying drawings.

Figure 1:
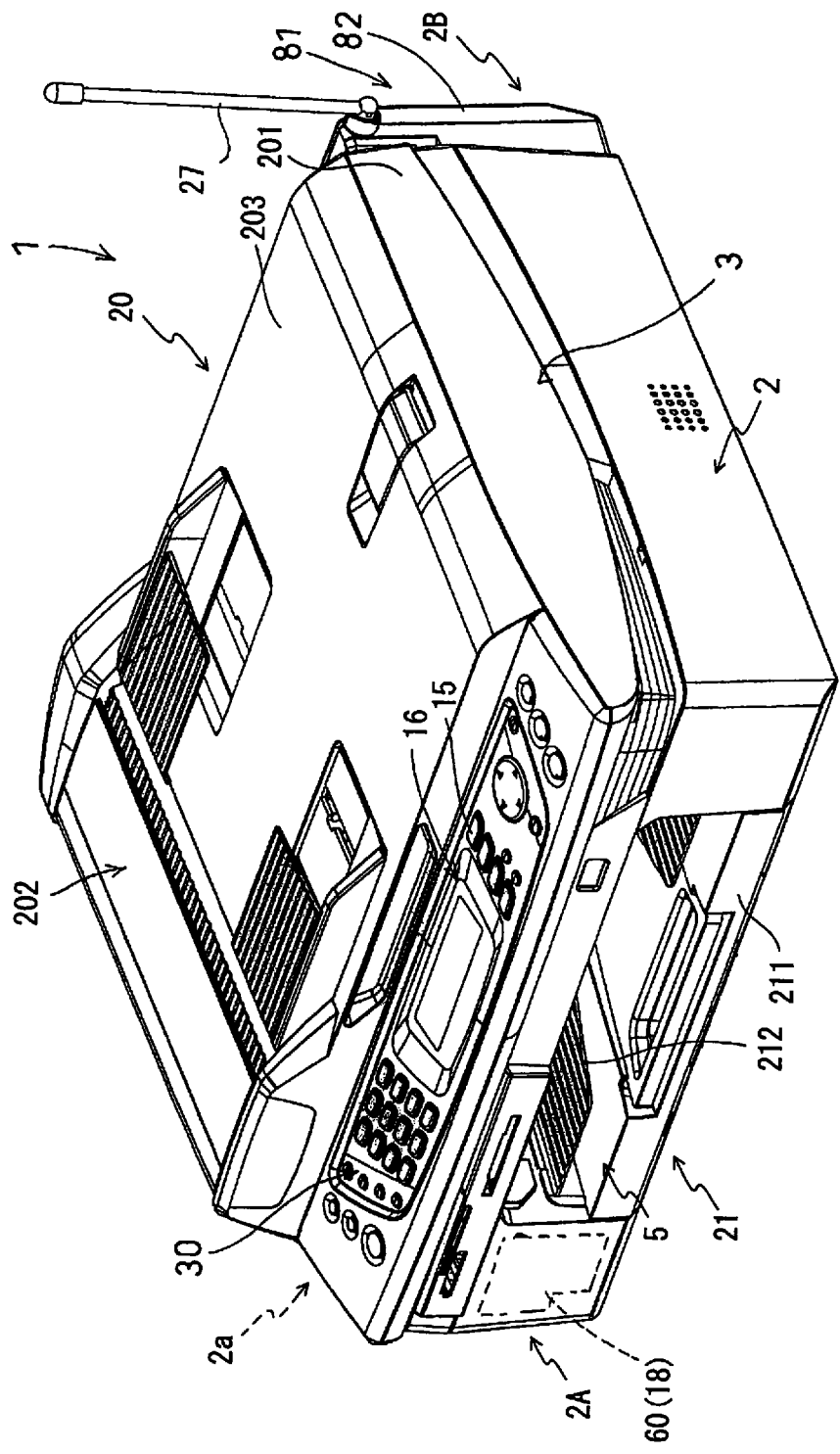
FIG. 1 is an external view of a MFP including a communication apparatus according to one embodiment of the invention.
Figure 2:
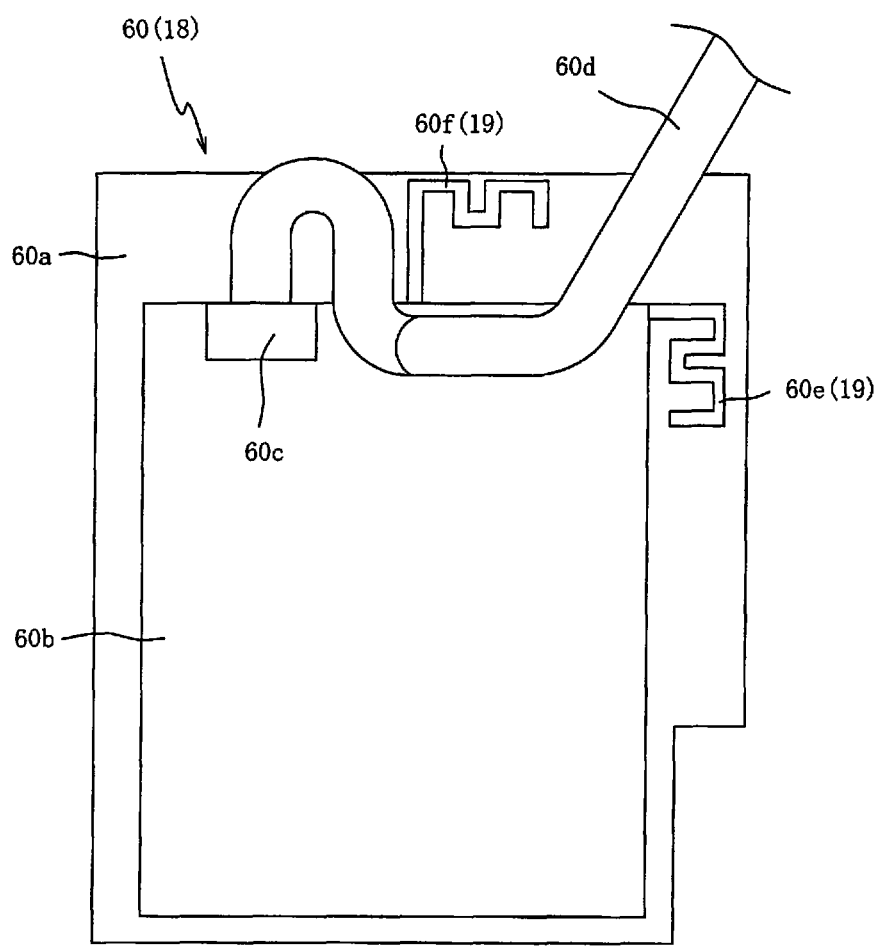
FIG. 2 is a front elevational view of a wireless LAN board included in the MFP.

Referring first to FIGS. 1 and 2, there will be described a MFP (Multi Function Peripheral) 1 including a communication apparatus according to one embodiment of the invention. FIG. 1 is an external view of the MFP 1.

The MFP 1 has various functions such as speech communication function, facsimile function, printer function, scanner function, and copy function. In this embodiment, the MFP 1 takes the form of a base unit of a digital cordless telephone system, and is used mainly for making a speech communication with a digital cordless handset 31 or a cordless unit (shown in FIG. 3) of the digital cordless telephone system and an external apparatus (not shown) connected with the digital cordless telephone system via a telephone line network 100 (shown in FIG. 3). The MFP 1 can also function as a communication apparatus capable of wireless data communication with an access point 51 (shown in FIG. 3) in compliance with a wireless LAN standard.

As shown in FIG. 1, the MFP 1 includes a main housing 2 and an upper housing 3. The main housing 2 is box-shaped and open on the upper side. The upper housing 3 is attached to the main housing 2 at a lateral side (i.e., at the left-hand side as seen in FIG. 1) to be vertically movable with respect to the main housing 2 such that the upper housing 3 is turned around a pivot shaft portion (not shown) such as hinge or hinge portion. The main housing 2 and the upper housing 3 are formed of synthetic resin by injection molding.

At a front side of the upper housing 3 (i.e., the lower side as seen in FIG. 1), an operation panel 30 is disposed. The operation panel 30 includes a first manual operation portion 15 having numerical buttons, a communication start button, a function button, and others. A user manipulates the first manual operation portion 15 to turn on/off the MFP 1, select a function to be implemented, and input various instructions.

The operation panel 30 further includes a first display portion 16 that may be a liquid crystal display (LCD). On the first display portion 16 are presented a menu, the operation status of the MFP 1, and others, in response to a manipulation of the first manual operation portion 15. That is, the user manipulates the first manual operation portion 15 to have information corresponding to the manipulation be presented on the first display portion 16. Thus, the user can view various kinds of information such as the communication status between the MFP 1 and the access point 51 and that between the MFP 1 and the cordless handset 31.

In the upper housing 3, a scanner portion 20 is disposed on the rear side (i.e., on the upper side as seen in FIG. 1) of the operation panel 30. The scanner portion 20 includes a document reading table 201 functioning as a FBS (Flatbed Scanner), and a document cover 203 having an ADF (Auto Document Feeder) 202. The document cover 203 is attached to the document reading table 201 at the rear side of the MFP 1 by means of a hinge (not shown) such that the document cover 203 is movable or openable/closable relative to the document reading table 201. Although not shown, a platen glass is disposed at an upper surface of the document reading table 201, and an image reading unit is disposed inside the document reading table 201.

On the other hand, in the main housing 2 is disposed a printer portion 21, which is an image recording apparatus of inkjet type that records an image on a recording sheet by selectively ejecting ink droplets on the basis of image data read by the scanner portion 20 or inputted from an external device. It is noted, however, that the image recording apparatus or the printer portion may not be of inkjet type, but various other recording methods such as electrophotography or thermal transfer can be employed as a method of image recording.

At the front side of the MFP 1 or of the printer portion 21, an opening 5 is formed. In the opening 5 is extractably inserted a sheet supply cassette 211, on which a plurality of recording sheets are stacked. Over the sheet supply cassette 211 is disposed a sheet catch tray 212 onto which a recording sheet on which an image has been recorded is ejected.

Inside the main housing 2 and inside the printer portion 21, a sheet feed path extends upward from a rear side of the sheet supply cassette 211 and then turns frontward in a U-like shape to be connected to the sheet catch tray 212. In the printer portion 2, a sheet supply unit and a printhead (neither shown) are also disposed. The sheet supply unit supplies or picks up the recording sheets one by one from the rear side of the sheet supply cassette 211. The printhead is disposed in the sheet feed path and ejects ink droplets onto a surface of the recording sheet being fed along the sheet feed path to record an image.

On a left side wall 2a of the main housing 2, a base handset 24 (shown in FIG. 3) and a support portion (not shown) that supports the base handset 24 while the MFP 1 is in a standby mode are disposed, so as to enable a speech communication with the cordless handset 31 or with an external apparatus through the telephone line network 100. Thus, the MFP 1 is constituted by a main body and the support portion A wireless communication unit 81 is attached to a right rear end portion of the main housing 2. The wireless communication unit 81 includes a casing 82 of synthetic resin, and accommodates a communication board (not shown) including a first digital-cordless-communication control portion 26 (shown in FIG. 3), detailed description of which will be provided later. In brief, the first digital-cordless-communication control portion 26 wirelessly connects the base handset 24 of the MFP 1 as the base unit the cordless handset 31 located at a position remote from the MFP 1, and has a first cordless-phone antenna 27 protruding from the casing 82 to transmit and receive signals.

As described above, the MFP 1 has the base handset 24 attached to the MFP 1 as the base unit, and the wireless communication unit 81 that wirelessly connects the base handset 24 to the cordless handset 31. Thus, the base handset 24 and the cordless handset 31 are selectively used as desired, and further a communication can be made between the base handset 24 and the cordless handset 31.

The main housing 2 has four corners including a corner 2A and a corner 2B that are opposed to each other. A wireless communication unit board (or a wireless LAN board) 60 including a wireless LAN communication control portion 18 (shown in FIG. 3), and a main circuit board (not shown) for electrically controlling operations of devices included in the MFP 1, are disposed inside the corner 2A. The wireless communication unit 81 accommodating the communication board including the first digital-cordless-communication control portion 26 is attached to the corner 2B.

According to the MFP 1, the wireless LAN board 60 including the wireless LAN communication control portion 18 and the main circuit board (not shown) are disposed apart from the wireless communication unit 81 accommodating the communication board (not shown) including the first digital-cordless-communication control portion 26, as described above. Thus, the wireless LAN board 60 including the wireless LAN communication control portion 18, the communication board including the first digital-cordless-communication control portion 26, and the main circuit board do not tend to suffer from noise.

FIG. 2 is a front elevational view of the wireless LAN board 60 including the wireless LAN communication control portion 18. As shown in FIG. 2, the wireless LAN board 60 is constructed such that a circuit module 60b is mounted on a surface of a glass epoxy substrate 60a with a connector 60c disposed at a portion of the circuit module 60b. A harness 60d for wiring is detachably connected with the connector 60c.

As shown in FIG. 2, a main antenna portion 60e and a sub antenna portion 60f are formed on the surface of the substrate 60a and in the vicinity of the circuit module 60b. The main antenna portion 60e is disposed at a lateral side of the circuit module 60b, and the sub antenna portion 60f is disposed at an upper side of the circuit module 60b. The main and sub antenna portions 60e and 60f cooperate to constitute a wireless LAN antenna 19 (shown in FIG. 3), by means of which the wireless LAN communication control portion 18 and the access point 51 are wirelessly connected to each other.

Main sources of noise are a power source board (not shown) and the communication board including the first digital-cordless-communication control portion 26. The first cordless-phone antenna 27 (i.e., an antenna for the telephone system) is connected with the communication board including the first digital-cordless-communication control portion 26. Since the first cordless-phone antenna 27 is adapted to communications using intense radio waves, the first cordless-phone antenna 27 can be a high noise source particularly.

Hence, if the communication board (not shown) including the first digital-cordless-communication control portion 26 is disposed at a position close to the wireless LAN board 60 that wirelessly sends and receives data, the wireless LAN communication control portion 18 might be subjected to noise and unable to operate normally.

According to the MFP 1, however, the wireless LAN board 60 is disposed at the front left corner 2A of the main housing 2, and the communication board including the first digital-cordless-communication control portion 26 is disposed at the opposing corner, i.e., the rear right corner 2B of the main housing 2. Thus, inside a single housing, namely, the main housing 2, of the MFP 1, the wireless LAN board 60 is positionally separated as much as possible from the communication board including the first digital-cordless-communication control portion 26, in order that an operation of the wireless LAN board 60 does not tend to be adversely affected by an operation of the communication board including the first digital-cordless-communication control portion 26. This arrangement is employed as an effective countermeasure to noise. Thus, the wireless LAN board 60 can make a normal communication.

Figure 3:
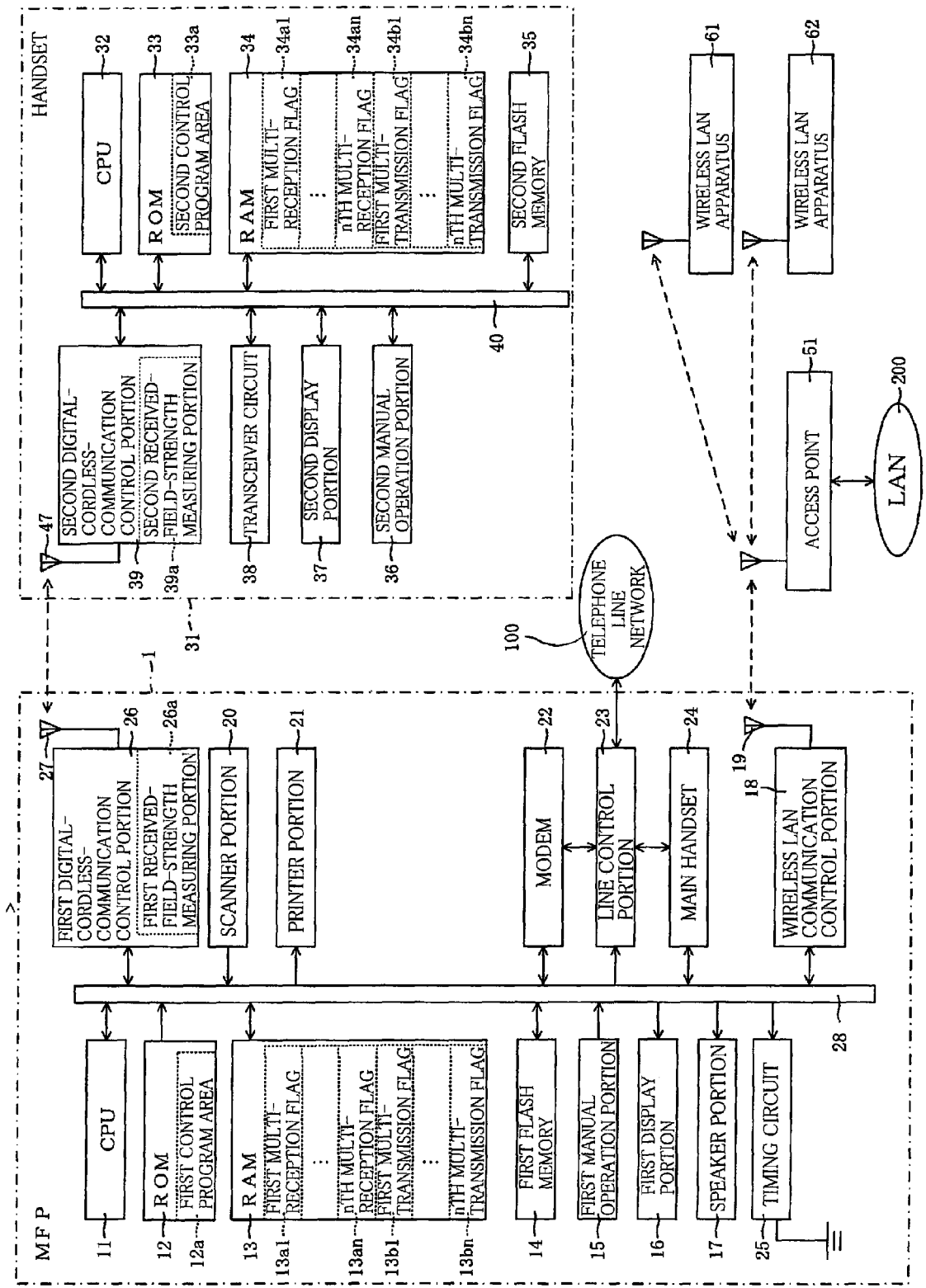
FIG. 3 is a block diagram of an electrical structure of the MFP and a cordless handset.

Referring next to FIG. 3, which is a block diagram illustrating an electrical structure of the MFP 1 and the cordless handset 31. The cordless handset 31 is a communication apparatus according to an embodiment of the invention, similarly to the MFP 1. Further, the MFP 1 and the cordless handset 31 cooperate to constitute a communication system according to an embodiment of the invention.

As shown in FIG. 3, the MFP 1 mainly includes a first CPU 11, a first ROM 12, a first RAM 13, a first flash memory 14, the first manual operation portion 15, the first display portion 16, a speaker portion 17, the wireless LAN communication control portion 18, the wireless LAN antenna 19, the scanner portion 20, the printer portion 21, a modem 22, a line control portion 23, the base handset 24, a timing circuit 25, and the first digital-cordless-communication control portion 26. These members 11-26 are connected with one another through a first bus line 28.

The first CPU 11 is an arithmetic unit that controls the members connected with one another via the first bus line 28, in accordance with fixed values and programs stored in the first ROM 12, the first RAM 13, and the first flash memory 14, or in accordance with various kinds of signals communicated through the wireless IAN communication control portion 18, the line control portion 23, and the first digital-cordless-communication control portion 26.

The first ROM 12 is a memory not rewritable and includes a first control program area 12a where various kinds of control programs executed in the MFP 1 are stored. The control programs stored in the first control program area 12a include programs for implementing processings illustrated in FIGS. 5, 6 and 8A described later.

The first RAM 13 is a rewritable memory for temporarily storing various kinds of data. The first RAM 13 has a number n of multi-reception flags 13a1-13an, i.e., a first multi-reception flag 13a1, a second multi-reception flag 13a2, and a nth multi-reception flag 13an, and a number n of multi-transmission flags, i.e., a first multi-transmission flag 13b1, a second multi-transmission flag 13b2, . . . and a nth multi-transmission flag 13bn.

The first to nth multi-reception flags 13a1-13an are assigned to respective frequency channels that are used when the MFP 1 functions as a digital cordless telephone and makes a wireless communication with the cordless handset 31 by utilizing FHSS technology.

Each of the multi-reception flags 13a1-13an indicates a number of times a data piece is transmitted from the cordless handset 31 to the MFP 1 through a corresponding one of the channels. In other words, the multi-reception flag 13a1-13an indicates whether a number of times a data piece is to be received by the MFP 1 from the cordless handset 31 through a corresponding channel is set at one or two. The value of the multi-reception flag 13a1-13an is "OFF" when the number of times a data piece is received from the cordless handset 31 is set at one, and the value of the multi-reception flag 13a1-13an is "ON" when the number of times a data piece is received from the cordless handset 31 is set at two.

For instance, the value of the first multi-reception flag 13a1 being "ON" means that the number of times a data piece is received by the MFP 1 through one of the channels which is associated with the first multi-reception flag 13a1 is set at two, and the value of the second multi-reception flag 13a2 being "OFF" means that the number of times a data piece is received by the MFP 1 through another channel which is associated with the second multi-reception flag 13a2 is set at one.

The values of the multi-reception flags 13a1-13an are initialized or set to "OFF" when the MFP 1 is turned on, and suitably set to one of "ON" and "OFF" depending on the level of a field strength of an external radio wave in a reception-number setting processing (shown in FIG. 5 and described later) that is repeatedly executed at predetermined time intervals, e.g., 10 ms. A detailed description on the switching of the values of the multi-reception flags 13a1-13an will be provided later.

The first to nth multi-transmission flags 13b-13bn are assigned to respective frequency channels that are used when the MFP 1 functions as the digital cordless telephone and makes a wireless communication with the cordless handset 31 by utilizing FHSS technology.

Each of the multi-transmission flags 13b1-13bn indicates whether a number of times the MFP 1 transmits a data piece to the cordless handset 31 through a corresponding one of the channels is set at one or two. The value of the multi-transmission flag 13b1-13bn is "OFF" when the number of times a data piece is transmitted to the cordless handset 31 is set at one, and the value of the multi-transmission flag 13b1-13bn is "ON" when the number of times a data piece is transmitted to the cordless handset 31 is set at two.

For instance, the value of the first multi-transmission flag 13b1 being "ON" means that the number of times a data piece is transmitted to the cordless handset 31 through one of the channels which is associated with the first multi-transmission flag 13b1 is set at two, and the value of the second multi-reception flag 13b2 being "OFF" means that the number of times a data piece is transmitted to the cordless handset 31 through another channel which is associated with the second multi-transmission flag 13b2 is set at one.

The values of the multi-transmission flags 13b1-13bn are initialized or set to "OFF" when the MFP 1 is turned on, and thereafter suitably set to one of "ON" and "OFF" depending on a request from the cordless handset 31 as another communication apparatus, in a transmission-number setting processing (illustrated in FIG. 6 and described later) that is repeatedly executed at predetermined time intervals, e.g., 10 ms. A detailed description on the switching of the values of the multi-transmission flags 13b1-13bn will be provided later.

The first flash memory 14 is a rewritable non-volatile memory. Data stored in the first flash memory 14 is retained after the MFP 1 is turned off. The speaker portion 17 outputs various kinds of sounds depending on the situations to inform the user of the situations for instance, the various kinds of sounds include an operation sound outputted when the first manual operation portion 15 is manipulated, an alarm sound outputted when an error occurs, and a ring alert outputted when a call is incoming.

The scanner portion 20 operates to read an image on a document sheet set on the document reading table 201. The first display portion 16 can present the image, and printable data of the image can be generated on the basis of which the printer portion 21 can record the image. The data of the image read by the scanner portion 20 is stored in a predetermined memory area in the first RAM 13 in a case where the MFP 1 is placed in one of a facsimile mode, a scanner mode, and a copy mode. The printer portion 21 operates to record an image on a recording sheet supplied from the sheet supply cassette 211 on the basis of an instruction from the first CPU 11.

The modem 22 modulates data to be transmitted that is stored in the first RAM 13, into an image signal transmittable to the telephone line network 100, and sends the modulated data to the telephone line network 100 through the line control portion 23. The modem 22 also receives an image signal inputted from the telephone line network 100 through the line control portion 23, and demodulates the image signal into image data that can be presented on the first display portion 16 or recordable by the printer portion 21. The line control portion 23 is connected with the telephone line network 100, and operates to send a dial signal to the telephone line network 100 and respond to a ring signal from the telephone line network 100.

The base handset 24 is used for making a speech communication with the cordless handset 31 or an external apparatus (not shown) connected with the MFP 1 via the telephone line network 100. The base handset 24 has a microphone and a speaker (neither shown). The microphone converts a sound into an audio signal and outputs the audio signal to the circuit control portion 23, and the speaker converts an audio signal inputted from the circuit control portion 23 into a sound and outputs the sound to the external space.

The base handset 24 is electrically connected to the line control portion 23 or the first digital-cordless-communication control portion 26 when the base handset 24 is pickup up or lifted off the support portion of the MFP 1, that is, when an "off-hook" operation is made. When the base handset 24 is replaced onto the support portion of the MFP 1, that is, when an "on-hook" operation is made, the base handset 24 is disconnected from the line control portion 23 or the digital cordless communication control portion 26. The timing circuit 25 is a known circuit that has an internal clock representing the current time and calculates a time period by comparing a time at which a counting of time is commenced to the current time.

The first digital-cordless-communication control portion 26 constitutes a part of the communication board, and is connected with the first cordless-phone antenna 27. When the base handset 24 and the first digital-cordless-communication control portion 26 are connected to each other as a result of an off-hook operation of the base handset 24 or for other reasons, the MFP 1 and the cordless handset 31 are wirelessly connected to each other.

In the present embodiment, the MFP 1 and the cordless handset 31 wirelessly communicates with each other by a FHSS method, according to which a plurality of channels having respective center frequencies and defined across a frequency band (2.4000-2.4835 GHz) are usable. The frequency band of 2.4000-2.4835 GHz is dedicated to digital cordless telephone system according to communications standards.

When an audio signal is sent from the base handset 24 to the digital cordless communication control portion 26, the audio signal is converted into a digital signal for communication and outputted or sent to the cordless handset 31. On the other hand, when a digital signal for communication is received from the cordless handset 31, the digital signal is converted into an audio signal and outputted to the base handset 24.

The first digital-cordless-communication control portion 26 includes a first received-field-strength measuring portion 26a, which measures a field strength of an external radio wave received through the first cordless-phone antenna 27. The first digital-cordless-communication control portion 26 further includes a first frequency-hopping control portion (not shown) including a hopping pattern table, a hopping counter, and a clock, for implementing a wireless communication with the cordless handset 31 by the FHSS method.

The wireless LAN communication control portion 18 constitutes a part of the wireless LAN board 60, and is connected with the wireless LAN antenna 19 including the main antenna portion 60e and the sub antenna portion 60e. The wireless LAN communication control portion 18 is wirelessly connected with the access point 51 as a wireless LAN station thorough the wireless LAN antenna 19. Thus, the MFP 1 can make a data communication with wireless LAN terminals 61, 62 that are wirelessly connected with the access point 51.

The wireless LAN communication control portion 18 is wirelessly connected with the access point 51 via the wireless LAN antenna 19, and with a LAN 200 via the access point 51. Thus, the MFP 1 can make a data communication with an external apparatus (not shown) connected to the LAN 200.

The access point 51 is a wireless LAN device known as a communication device and wirelessly connected with a plurality of wireless LAN apparatuses such as the MFP 1 and the wireless LAN terminals 61, 62, so as to function as a relay device for connecting these wireless LAN apparatuses to the LAN 200.

On the other hand, as shown in FIG. 3, the cordless handset 31 mainly includes a second CPU 32, a second ROM 33, a second RAM 34, and a second flash memory 35, a second manual operation portion 36, a second display portion 37, a transceiver circuit 38, and a second digital-cordless-communication control portion 39. These members 32-39 are connected with one another through a second bus line 40.

The second CPU 32 is an arithmetic unit that controls the members connected with one another via the second bus line 40, in accordance with fixed values and programs stored in the second ROM 33, the second RAM 34, and the second flash memory 35, or in accordance with various kinds of signals communicated through the wireless LAN communication control portion 39.

The second ROM 33 is a memory not rewritable and includes a second control program area 33a where various kinds of control programs executed in the cordless handset 31 are stored. The control programs stored in the second control program area 33a include programs for implementing processings illustrated in FIGS. 6, 7 and 8B and described later.

The second RAM 34 is a rewritable memory for temporarily storing various kinds of data. The second RAM 34 has a number n of multi-transmission flags 34a1-34an, i.e., a first multi-reception flag 34a1, a second multi-reception flag 34a2, ... and a nth multi-reception flag 34an, and a number n of multi-transmission flags, i.e., a first multi-transmission flag 34b1, a second multi-transmission flag 34b2, ... and a nth multi-transmission flag 34bn.

The first to nth multi-reception flags 34a1-34an are assigned to respective frequency channels that are used when the cordless handset 31 functions as a digital cordless telephone and makes a wireless communication with the MFP 1 by the FHSS method.

Each of the multi-reception flags 34a1-34an indicates whether a number of times a data piece is transmitted from the MFP 1 to the cordless handset 31 through a corresponding one of the channels is set at one or two. The value of the multi-reception flag 34a1-34an is "OFF" when the number of times a data piece is received from the MFP 1 is set at one, and the value of the 34a1-34an flag is "ON" when the number of times a data piece is received from the MFP 1 is set at two.

For instance, the value of the first multi-reception flag 34a1 being "ON" means that the number of times a data piece is received by the cordless handset 31 through one of the channels which is associated with the first multi-reception flag 34a1 is set at two, and the value of the second multi-reception flag 34a2 being "OFF" means that the number of times a data piece is received by the cordless handset 31 through another channel which is associated with the second multi-reception flag 34a2 is set at one.

The values of the multi-reception flags 34a1-34an are initialized or set to "OFF" when the cordless handset 31 is turned on, and thereafter suitably set to one of "ON" and "OFF" depending on a field strength of an external radio wave in a reception-number setting processing (illustrated in FIG. 7 and described later) that is executed at constant intervals, e.g., 10 ms. A detailed description on the switching of the values of the multi-reception flags 34a1-34an will be provided later.

The first to nth multi-transmission flags 34b1-34bn assigned to respective frequency channels that are used when the cordless handset 31 functions as the digital cordless telephone and makes a wireless communication with the MFP 1 by the FHSS method.

Each of the multi-transmission flags 34b1-34bn indicates whether a number of times the cordless handset 31 transmits a data piece to the MFP 1 through a corresponding one of the channels is set at one or two. The value of the multi-transmission flag 34b1-34bn is "OFF" when the number of times a data piece is transmitted to the MFP 1 is set at one, and the value of the multi-transmission flag 34b1-34bn is "ON" when the number of times a data piece is transmitted to the MFP 1 is set at two.

For instance, the value of the first multi-transmission flag 34b1 being "ON" means that the number of times a data piece is transmitted to the MFP 1 through one of the channels which is associated with the first multi-transmission flag 34b1 is set at two, and the value of the second multi-reception flag 34b2 being "OFF" means that the number of times a data piece is transmitted to the MFP 1 through another channel which is associated with the second multi-transmission flag 34b2 is set at one.

The values of the multi-transmission flags 34b1-34bn are initialized or set to "OFF" when the cordless handset 31 is turned on, and thereafter suitably set to one of "ON" and "OFF" depending on a request from the MFP 1 in a transmission-number setting processing (illustrated in FIG. 6 and described later) that is executed at constant intervals, e.g., 10 ms. A detailed description on the switching of the values of the multi-transmission flags 34b1-34bn will be provided later.

The second flash memory 35 is a rewritable non-volatile memory. Data stored in the second flash memory 35 is retained after the cordless handset 31 is turned off. The second manual operation portion 36 is manipulated when the user inputs an instruction related to management of the cordless handset 31, and when a speech communication is made between the cordless handset 31 and the MFP 1 or an external apparatus (not shown) connected to the cordless handset 31 via the MFP 1 and the telephone line network 100. The second manual operation portion 36 has numerical buttons (or a numeric keypad), a communication start button, a function button, and others. The second display portion 37 operates, when a manipulation to manage the cordless handset 31 is made, and when a speech communication between the cordless handset 31 and the MFP 1 or an external apparatus (not shown) is made, to present a telephone number inputted through the second manipulation portion 36, and various kinds of information during a speech communication for instance, the second display portion 37 is constituted by a display device such as LCD.

The transceiver circuit 38 is a device for enabling a speech communication with the MFP 1 or an external apparatus (not shown) connected to the cordless handset 31 via the telephone line network 100. The transceiver circuit 38 is connected with a microphone and a speaker (neither shown). The microphone converts a sound into an audio signal and inputs the audio signal to the transceiver circuit 38. The speaker converts the audio signal inputted from the transceiver circuit 38 into a sound and outputs the sound to the external space. The speaker also outputs various kinds of sounds depending on the situations to inform the user of the situations for instance, the various kinds of sounds include an operation sound outputted when the second manual operation portion 36 is manipulated, an alarm sound outputted when an error occurs, and a ring alert outputted when a call is incoming.

The transceiver circuit 38 is connected to the second digital-cordless-communication control portion 39 when the user manipulates the second manual operation portion 36 in order to start a speech communication. The transceiver circuit 38 is disconnected from the second digital-cordless-communication control portion 39 when the user manipulates the second manual operation portion 36 in order to terminate the speech communication.

With the second digital-cordless-communication control portion 39, a second cordless-phone antenna 47 is connected. When the transceiver circuit 38 and the second digital-cordless-communication control portion 39 are connected to each other, by the manipulation of the second manual operation portion 36 to start a speech communication or in other ways, a wireless communication is established between the cordless handset 31 and the MFP 1, by the FHSS method as described above.

When an audio signal is sent to the second digital-cordless-communication control portion 39 from the transceiver circuit 38, the second digital-cordless-communication control portion 39 converts the audio signal into a digital signal for wireless communication, which is sent out or outputted to the MFP 1. On the other hand, when a digital signal for wireless communication as sent from the MFP 1 is received by the second digital-cordless-communication control portion 39, the second digital-cordless-communication control portion 39 converts the digital signal into an audio signal, which is outputted to the transceiver circuit 38.

The second digital-cordless-communication control portion 39 includes a second received-field-strength measuring portion 39a, which measures a field strength of an external radio wave received through the second cordless-phone antenna 47. The second digital-cordless-communication control portion 39 further includes a second frequency-hopping control portion (not shown) including a hopping pattern table, a hopping counter, and a clock, for implementing a wireless communication with the MFP 1 by the FHSS method.

Figure 4:
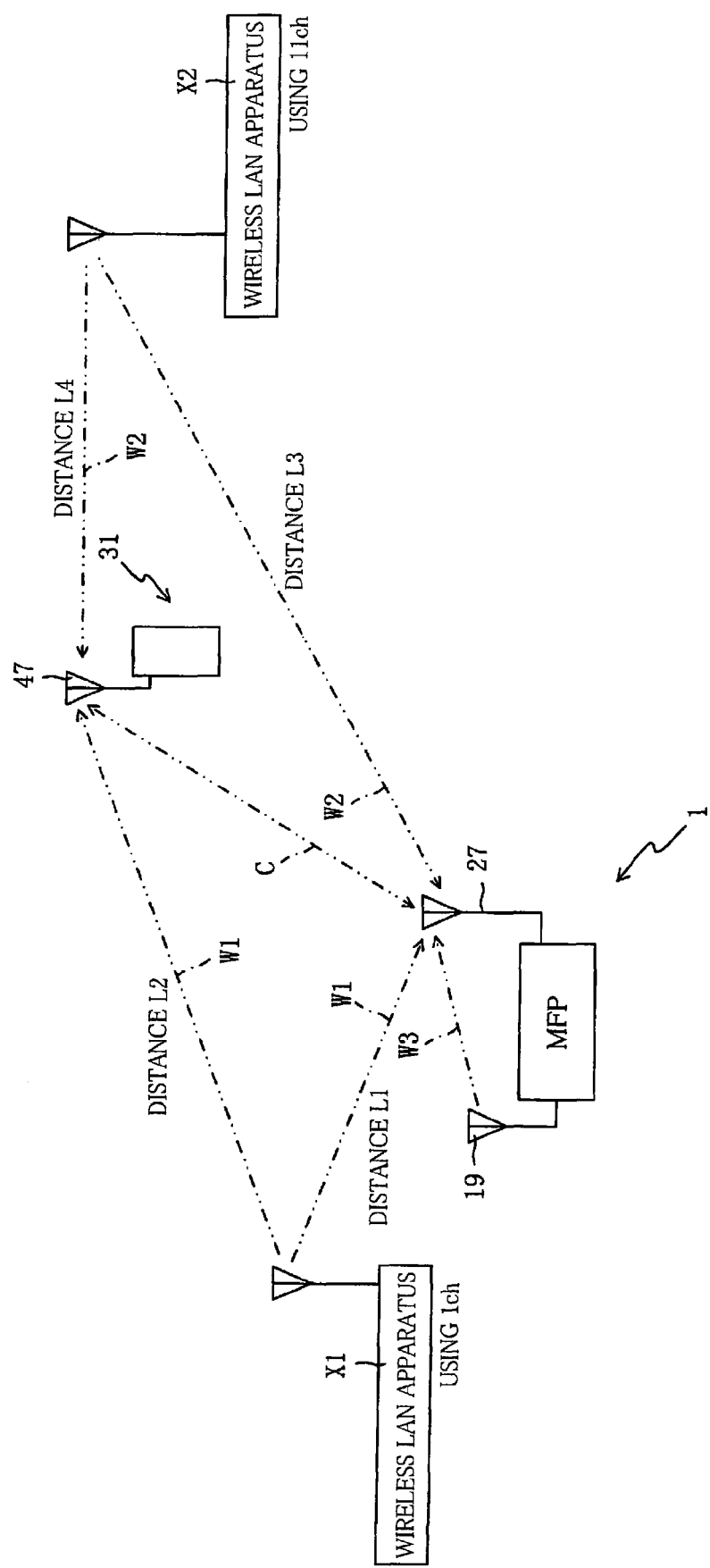
FIG. 4 is a schematic view of a system including the MFP and the cordless handset as cordless telephones that wirelessly communicate with each other, and wireless LAN apparatuses as sources of external radio waves affecting operations of the MFP and the cordless handset.

Referring now to FIG. 4, there will be described an interference by an external radio wave to the wireless communication (indicated by imaginary line C) between the MFP 1 and the cordless handset 31, when the MFP 1 and the cordless handset 31 function as a base unit and a cordless unit of a digital cordless telephone system, respectively.

FIG. 4 is a schematic view of a system including the MFP 1 and the cordless handset 31 functioning as a base unit and cordless handset of a digital cordless telephone system and making a wireless communication, and wireless LAN apparatuses X1, X2 as sources of external radio waves affecting operations of the MFP 1 and the cordless handset 31. The wireless LAN apparatuses X1, X2 may be various apparatuses capable of communication using wireless LAN technology, such as access point and wireless LAN printer.

Generally, usable frequency bands are dedicated to respective communication methods or communication standards, and frequency channels are defined corresponding to respective center frequencies of the frequency bands.

For instance, a frequency band of 2.4000-2.4835 GHz is used by digital cordless telephone system, that is, used when a wireless communication is made between a base unit (corresponding to the MFP 1 in the present embodiment) and a cordless unit (corresponding to the cordless handset 31) of a digital cordless telephone system, and between cordless handsets of a digital cordless telephone system. A frequency band of 2.4000-2.497 GHz is used when a wireless communication is made in compliance with wireless communication standards such as IEEE802.11b/g that is a wireless LAN standard allowing connection and communication between a terminal apparatus (corresponding to the MFP 1 in the present embodiment) and an access point (corresponding to the access point 51 and the wireless LAN apparatuses X1, X2 in the present embodiment).

As described above, wireless communications can be made by various apparatuses through or using a same frequency band. Such wireless communications interfere with one another due to overlapping of the frequency bands used in the wireless communications, resulting in increase in a transfer error rate of each of the wireless communications, degrading the communication quality thereof.

For instance, as shown in FIG. 4, where a speech communication is made between the MFP 1 and the cordless handset 31 respectively functioning as a base unit and a cordless unit of a digital cordless telephone system, in the form of a wireless communication (indicated by imaginary line C) in compliance with the digital cordless telephone standard, when external wireless LAN apparatuses X1, X2 respectively make wireless communications in compliance with a wireless LAN standard or standards, the frequency band used by the digital cordless telephone system and the frequency band(s) used by the wireless LAN communications overlap with each other, which might result in interference between the wireless communication mad through the digital cordless telephone system (i.e., the wireless communication between the MFP 1 and the cordless handset 31), and the wireless LAN communications respectively made by the wireless LAN apparatuses X1, X2. When such interference occurs, the transfer error rates of the communications increase and the communication qualities thereof degrade, which causes degradation in the speech communication made through the digital cordless telephone system, for instance.

Referring to FIG. 4, from the standpoint of the MFP 1 and the cordless handset 31, the wireless LAN apparatuses X1, X2 are sources of external radio waves adversely affecting the communication between the MFP 1 and the cordless handset 31. The level of the interference of each of the external radio waves with the communication between the MFP 1 and the cordless handset 31 depends on the level of the field strength of the external radio wave as received by the MFP 1 and the cordless handset 31. That is, the level of the interference of the external radio wave with the wireless communication made through the digital cordless telephone system or between the MFP 1 and the cordless handset 31 increases with the level of the field strength of the external radio wave.

The level of the field strength of the external radio wave as received by the MFP 1 and the cordless handset 31 depends on factors including a positional relationship between the MFP 1 or the cordless handset 31 and the sources of the external radio waves (i.e., the wireless LAN apparatuses X1, X2). For instance, as shown in FIG. 4, an external radio wave W1 emitted from the wireless LAN apparatus X1 is received by the first cordless-phone antenna 27 of the MFP 1 that is away from the wireless LAN apparatus X1 by a distance L1, and also received by the second cordless-phone antenna 47 of the cordless handset 31 that is away from the wireless LAN apparatus X1 by a distance L2. Since the distance L1 is smaller than the distance L2, the field strength of the external radio wave WI as detected at the MFP 1 takes a value larger than that as detected at the cordless handset 31. Hence, the external radio wave W1 affects the speech communication more seriously at the MFP 1 than at the cordless handset 31.

In this case, depending on the level of the field strength of the external radio wave W1, there occurs a state where the quality of audio received by the cordless handset 31 (i.e., the communication quality or speech quality at the cordless handset 31) does not degrade, but the quality of the audio received by the MFP 1 considerably degrades.

For instance, when the external radio wave W1 is emitted from the wireless LAN apparatus X1 through or using a frequency channel 1 ch for making a wireless LAN communication, there occurs a state where when a wireless communication is made between the cordless handset 31 and the MFP 1 through or using a frequency channel overlapping the frequency channel 1 ch, the quality of the audio received by the cordless handset 31 does not degrade, but the quality of the audio received by the MFP 1 considerably degrades.

The cordless handset 31 recognizes that the quality of the audio received by itself is not adversely affected by the external radio wave W1 emitted through the channel 1 ch, but can not recognize that there is a possibility that the MFP 1 is adversely affected by the external radio wave W1. That is, the cordless handset 31 can not recognize that when the cordless handset 31 makes a wireless communication with the MFP 1 using a frequency channel overlapping the frequency channel 1 ch, the quality of audio received by the MFP 1 is considerably poor.

On the other hand, an external radio wave W2 emitted from the wireless LAN apparatus X2 is received by the first cordless-phone antenna 27 of the MFP 1 that is away from the wireless LAN apparatus X2 by a distance L3, and also received by the second cordless-phone antenna 47 of the cordless handset 31 that is away from the wireless LAN apparatus X2 by a distance L4. Since the distance L3 is larger than the distance L4, the field strength of the external radio wave W2 as detected at the cordless handset 31 takes a value larger than that as detected at the MFP 1. Hence, the external radio wave W2 affects the speech communication more seriously at the cordless handset 31 than at the MFP 1.

In this case, depending on the level of the field strength of the external radio wave W2, there occurs a state where the quality of audio received by the MFP 1 does not degrade, but the quality of audio received by the cordless handset 31 considerably degrades.

For instance, when the external radio wave W2 is emitted from the wireless LAN apparatus X2 through or using a frequency channel 1 1 ch for making a wireless LAN communication, there occurs a state where when a wireless communication is made between the FMP 1 and the cordless handset 31 by using a frequency channel overlapping the frequency channel 11 ch, the quality of the audio received by the MFP 1 does not degrade, but the quality of the audio received by the cordless handset 31 considerably degrades.

The MFP 1 recognizes that the quality of the audio received by itself is not adversely affected by the external radio wave W2 emitted through the channel 1 11 ch, but can not recognize that there is a possibility that the cordless handset 31 is adversely affected by the external radio wave W2. That is, the MFP 1 can not recognize that when the MFP 1 makes a wireless communication with the cordless handset 31 through or using a frequency channel overlapping the frequency channel 11 ch, the quality of the audio received by the cordless handset 31 is considerably poor.

In the present embodiment, the MFP 1 is capable of making a wireless communication by functioning as a base unit of a digital cordless telephone system, and of making a wireless communication through a wireless LAN. A radio wave emitted from the wireless LAN antenna 19 of the MFP 1 is received as an external radio wave W3 having a relatively high field strength by the first cordless-phone antenna 27 of the MFP 1. When the MFP 1 makes a wireless communication with the cordless handset 31, this wireless communication is subjected to interference by the external radio wave W3, resulting in degradation in the quality of the audio received by the MFP 1 in the wireless speech communication with the cordless handset 31.

Referring next to FIGS. 5-8, there will be described a way of inhibiting the degradation in the quality of the received audio or in the communication quality, in the wireless communication between the MFP 1 and the cordless handset 31, even in the presence of an external radio wave, so as to maintain an excellent communication quality.

Figure 5:
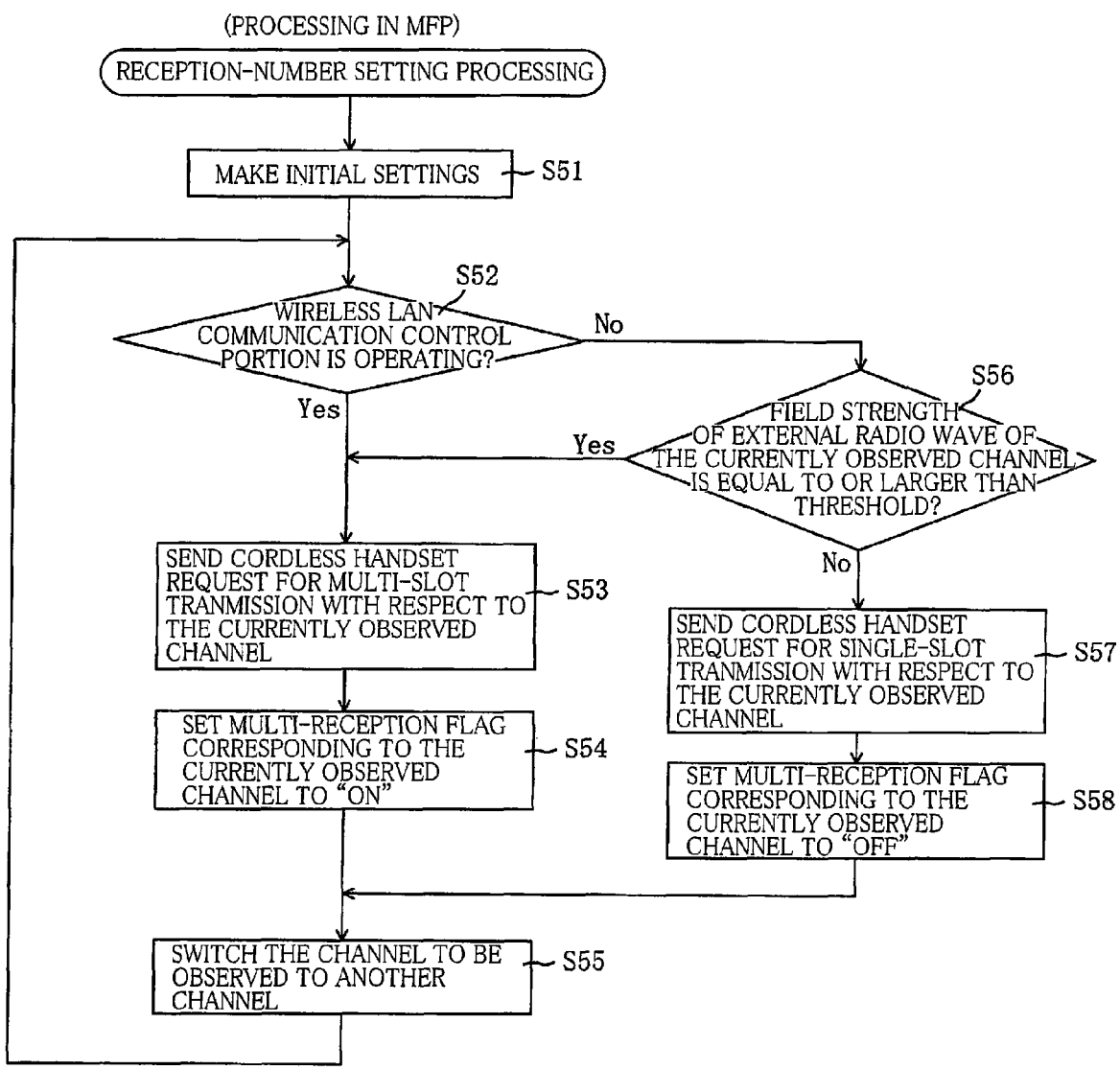
FIG. 5 is a flowchart illustrating a reception-number setting processing implemented in the MFP.

FIG. 5 is a flowchart illustrating a reception-number setting processing executed by the first CPU 11 of the MFP 1. The reception-number setting processing of FIG. 5 is initiated when the MFP 1 is turned on, and repeatedly executed while the MFP 1 is on. During the repeated execution of the reception-number setting processing, the frequency channel, which is used in a wireless communication made through the digital cordless telephone system and is to be observed, is switched from one to another at constant time intervals (e.g., 10 ms).

As shown in FIG. 5, the reception-number setting processing is initiated with step S51 when the MFP 1 is turned on. In step S51, initial settings are made, that is, the value of the frequency channel to be observed is set at an initial value, which corresponds to one of a plurality of frequency channels to be used in the wireless communication, and the first to nth multi-reception flags 13a1-13an are set to "OFF". By making the initial settings in step S51, the number of times the MFP 1 receives audio data from the cordless handset 31 is set at an initial value, that is one.

After step S51, the processing flow goes to step S52 in which it is determined whether a wireless LAN communication is being made by the MFP 1, that is, whether the wireless LAN communication control portion 18 is operating or in a standby state. When it is determined that a wireless LAN communication is being made, an affirmative decision (YES) is made in step S52, and the processing flow goes to step S53 to send a request for multi-slot transmission with respect to the currently observed channel, to the cordless handset 31.

After step S53, the processing flow goes to step S54 to set one of the first to nth multi-reception flags 13a1-13an that corresponds to the currently observed channel to "ON", and then goes to step S55 in which the channel to be observed is updated or switched to another or the next channel. Then, the processing flow returns to step S52.

On the other hand, when it is determined in step S52 that a wireless LAN communication is not being made, a negative decision (NO) is made, and the processing flow goes to step S56 in which it is determined whether a field strength of an external radio wave emitted through or using a channel overlapping the currently observed channel, which field strength is measured by the first received-field-strength measuring portion 26a, is equal to or larger than a predetermined threshold (e.g., −70 dbm) or not.

When it is determined in step S56 that the field strength of the external radio wave emitted through or using the channel overlapping the currently observed channel is equal to or larger than the predetermined threshold, an affirmative decision (YES) is made and the processing flow goes to steps S53-S55. After step S55 in which the channel to be observed is updated or switched to another or the next channel, the processing flow returns to step S52.

On the other hand, when it is determined in step S56 that the field strength of the external radio wave emitted through or using the frequency channel overlapping the currently observed channel is smaller than the predetermined threshold, a negative decision (NO) is made and the processing flow goes to step S57 to send the cordless handset 31 a request for a single-slot transmission with respect to the currently observed channel.

After step S57, the processing flow goes to step S58 in which one of the first to nth multi-reception flags 13a1-13an that corresponds to the currently observed channel is set to "OFF", and then goes to step S55 to update or switch the channel to be observed to another or the next channel. Then, the processing flow returns to step S52.

Figure 6:
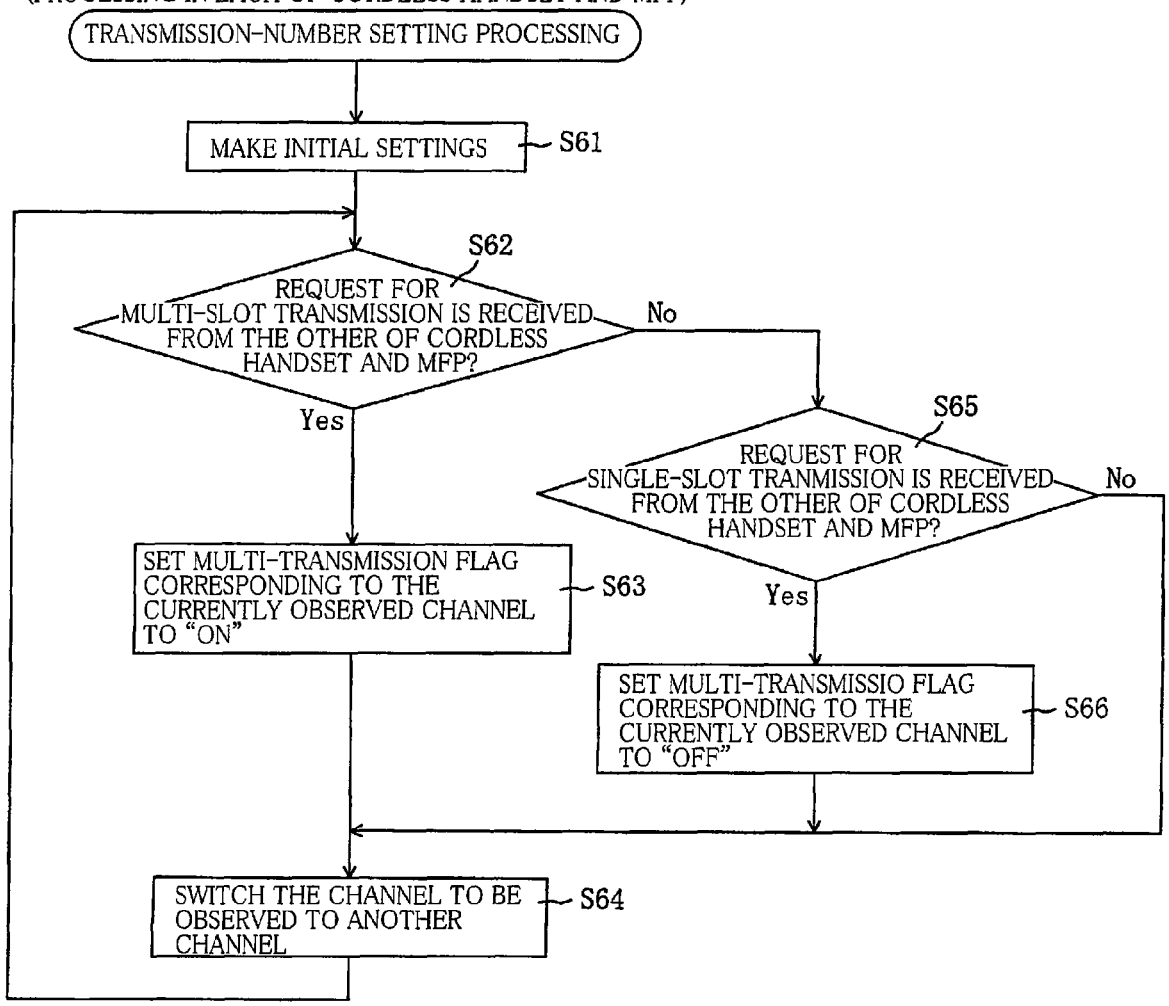
FIG. 6 is a flowchart illustrating a transmission-number setting processing implemented in the cordless handset and the MFP.

When the request for multi-slot transmission is sent in step S53 to the cordless handset 31 with respect to the currently observed channel, the cordless handset 31 sets to two the number of times the cordless handset 31 is to send audio data to the MFP 1 through or using the currently observed channel in the wireless communication with the MFP 1, as shown in FIG. 6.

When the request for single-slot transmission is sent in step S57 to the cordless handset 31 with respect to the currently observed channel, the cordless handset 31 sets to one the number of times the cordless handset 31 sends audio data to the MFP 1 through or using the currently observed channel in the wireless communication with the MFP 1, as shown in FIG. 6.

Thus, according to the reception-number setting processing executed in the MFP 1, when there is detected an external radio wave, which uses one of the channels usable by the MFP 1 to wirelessly communicate with the cordless handset 31, and which has a field strength equal to or larger than the predetermined threshold, it is assumed that there is a possibility that the external radio wave interferes with the wireless communication between the MFP 1 and the cordless handset 31, and the MFP 1 requests the cordless handset 31 to send data a number of times larger than the initial value (i.e., once), that is, twice, when the channel used by the external radio wave is used for the wireless communication between the MFP 1 and the cordless handset 31. As a result, when the MFP 1 receives audio data from the cordless handset 31 through or using the channel, the audio data is received twice, or two pieces of the same audio data are received. Hence, even in the presence of the external radio wave that might interfere with the wireless communication between the MFP 1 and the cordless handset 31 and degrade the communication quality thereof, the communication quality is actually inhibited from degrading but is maintained excellently.

On the other hand, when there is detected an external radio wave, which uses one of the channels usable by the MFP 1 to wirelessly communicate with the cordless handset 31, and which has a field strength smaller than the predetermined threshold, it is assumed that the external radio wave does not interfere with the wireless communication between the MFP 1 and the cordless handset 31, and the MFP 1 requests the cordless handset 31 to send data a number of times that corresponds to the initial value (i.e., once) when the channel used by the external radio wave is used for the wireless communication between the MFP 1 and the cordless handset 31. As a result, when the MFP 1 receives audio data from the cordless handset 31 through or using the channel that is free from the risk of degradation in the communication quality, the audio data is received once. Hence, the number of times data is received is not unnecessarily increased but is minimized, thereby saving power.

In the reception-number setting processing executed in the MFP 1, a series of steps S52-S58 is reiterated in a very short cycle, e.g., of 10 ms. Hence, when a wireless LAN communication is being made, audio data is received from the cordless handset 31 twice through or using substantially all the channels. As described above, a radio wave emitted from the wireless LAN antenna 19 highly probably interferes with the wireless communication between the MFP 1 and the cordless handset 31. Hence, while a wireless LAN communication is being made, audio data is received twice through all the channels so as to inhibit degradation in the communication quality of the communication between the MFP 1 and the cordless handset 31 and to excellently maintain the communication quality.

The change or setting in the number of times the MFP 1 receives audio data from the cordless handset 31 is made in the reception-number setting processing such that the MFP 1 itself detects in step S52 or S56 a channel using which the wireless communication with the cordless handset 31 might interfere with an external radio wave, and requests the cordless handset 31 to increase the number of times the cordless handset 31 sends the MFP 1 audio data on the basis of the result of the detection. Hence, when there is an external radio wave that interferes with the wireless communication between the MFP 1 and the cordless handset 31, the audio quality of the communication made through the frequency channel used by the external radio wave can be excellently maintained with stability.

With regard to the channel the wireless communication between the MFP 1 and the cordless handset 31 made using which is found by the MFP 1 and in step S52 or S53 to be free from the risk of interference with the external radio wave, the MFP 1 requests the cordless handset 31 to set at the initial value the number of times the cordless handset 31 sends audio data to the MFP 1 through or using the channel. Hence, the communication quality is not sacrificed for power saving.

Thus, according to the reception-number setting processing shown in FIG. 5 and executed in the MFP 1, the communication quality is excellently maintained while power is saved, without implementing a complex processing such as one for determining whether an error is included in every subframe.

FIG. 6 is a flowchart illustrating a transmission-number setting processing executed by the second CPU 32 in the cordless handset 31. The transmission-number setting processing of FIG. 6 is initiated when the cordless handset 31 is turned on, and repeatedly executed while the cordless handset 31 is on. During the repeated execution of the transmission-number setting processing, the frequency channel, which is used in a wireless communication made through the digital cordless telephone system and is to be observed, is switched from one to another at constant time intervals (e.g., 10 ms).

As shown in FIG. 6, the transmission-number setting processing is initiated with step S61 when the cordless handset 31 is turned on. In step S61, initial settings are made, that is, the value of the channel to be observed is set at an initial value, which corresponds to one of a plurality of frequency channels to be used in the wireless communication, and the first to nth multi-transmission flags 13$b$1-13$bn$ are set to "OFF". By making the initial settings in step S61, the number of times the cordless handset 31 sends audio data to the MFP 1 is set at an initial value, that is one.

After step S61, the processing flow goes to step S62 in which it is determined whether a request for multi-slot transmission is received from the MFP 1. When it is determined that a request for multi-slot transmission is received therefrom, an affirmative decision (YES) is made in step S62, and the processing flow goes to step S63 to set one of the first to nth multi-transmission flags 34$b$1-34$bn$ in the cordless handset 31 that corresponds to the currently observed channel to "ON". The processing flow then goes to step S64 to update or switch the channel to be observed to another or the next channel, and returns to step S61. As a result of the implementation of step S63, when the cordless handset 31 sends audio data to the MFP 1 through or using the channel in question, the audio data is sent twice.

On the other hand, when it is determined in step S62 that a request for multi-slot transmission is not received from the MFP 1, a negative decision (NO) is made and the processing flow goes to step S65 in which it is determined whether a request for single-slot transmission is received from the MFP 1.

When it is determined in step S65 that a request for single-slot transmission is received from the FMP 1, an affirmative decision (YES) is made and the processing flow goes to step S66 in which one of the first to nth multi-transmission flags 34$b$1-34$bn$ in the cordless handset 31 that corresponds to the currently observed channel is set to "OFF". Then, the processing flow goes to step S64 to update or switch the channel to be observed to another or the next channel, and returns to step S61. As a result of the implementation of step S66, when the cordless handset 31 sends audio data to the MFP 1 through or using the channel in question, the audio data is sent once.

On the other hand, when it is determined in step S65 that a request for single-slot transmission is not received from the FMP 1, a negative decision (NO) is made and the processing flow goes to step S64 to update or switch the channel to be observed to another or the next channel, and returns to step S61. That is, when the cordless handset 31 receives neither a request for multi-slot transmission nor a request for single-slot transmission from the MFP 1, the channel to be observed is updated or switched to another or the next channel, without changing the value of one of the first to nth multi-transmission flags 34b1-34b*n* in the cordless handset 31 that corresponds to the currently observed frequency channel.

According to the transmission-number setting processing executed in the cordless handset 31, the number of times the cordless handset 31 sends audio data to the MFP 1 is changed or set according to a request from the MFP 1 that is one of a request for multi-slot transmission or a request for single-slot transmission.

As described above, when the MFP 1 determines in the reception-number setting processing illustrated in FIG. 5 on the basis of the field strength of the external radio wave that the MFP 1 receives, that the wireless communication using a channel might interfere with the external radio wave, the MFP 1 sends a request for multi-slot transmission with respect to the channel. On the other hand, when the MFP 1 determines that the wireless communication using a channel is not subjected to interference by the external radio wave, the MFP 1 sends a request for single-slot transmission with respect to the channel.

Hence, the number of times the cordless handset 31 sends audio data to the MFP 1 is set in the transmission-number setting processing to a number appropriate for the environment in which the MFP 1 is situated, thereby enabling maintenance of an excellent communication quality as well as power saving.

FIG. 7 is a flowchart illustrating a reception-number setting processing executed by the second CPU 32 in the cordless handset 31. The reception-number setting processing of FIG. 7 is initiated when the cordless handset 31 is turned on, and repeatedly executed while the cordless handset 31 is on. During the repeated execution of the reception-number setting processing, the frequency channel, which is used in a wireless communication made through the digital cordless telephone system and is to be observed, is switched from one to another at constant time intervals (e.g., 10 ms).

As shown in FIG. 7, the reception-number setting processing is initiated with step S71 when the cordless handset 31 is turned on. In step S71, initial settings are made, that is, the value of the channel to be observed is set at an initial value, which corresponds to one of a plurality of frequency channels to be used in the wireless communication, and the first to nth multi-reception flags 34a1-34a*n* are set to "OFF". By making the initial settings in step S71, the number of times the MFP 1 sends audio data to the cordless handset 31 is set at an initial value, that is one.

After step S71, the processing flow goes to step S72 in which it is determined whether a field strength of an external radio wave of a frequency channel overlapping the currently observed channel, which field strength is measured by the second received-field-strength measuring portion 39a, is equal to or larger than a predetermined threshold (e.g., −70 dbm) or not.

When it is determined in step S72 that the field strength of the external radio wave of the frequency channel overlapping the currently observed channel is equal to or larger than the predetermined threshold, an affirmative decision (YES) is made and the processing flow goes to step S73 to send the MFP 1 a request for multi-slot transmission with respect to the currently observed channel.

After step S73, the processing flow goes to step S74 to set to "ON" one of the first to nth multi-reception flags 34a1-34a*n* that corresponds to the currently observed channel, and then to step S75 to update or switch the channel to be observed to another or the next channel. Thereafter, the processing flow returns to step S72.

On the other hand, when it is determined in step S72 that the field strength of the external radio wave of the frequency channel overlapping the currently observed channel is smaller than the predetermined threshold, a negative decision (NO) is made and the processing flow goes to step S76 to send the MFP 1 a request for single-slot transmission with respect to the currently observed channel.

After step S76, the processing flow goes to step S77 to set to "OFF" one of the first to nth multi-reception flags 34a1-34a*n* that corresponds to the currently observed channel, and then goes to step S75 to update or switch the channel to be observed to another or the next channel. The processing flow then returns to step S72.

When a request for multi-slot transmission is sent to the MFP 1 with respect to the currently observed channel in step S73, the MFP 1 sets to two the number of times the MFP 1 sends audio data to the cordless handset 31 when the MFP 1 makes a wireless communication with the cordless handset 31 through or using the channel in question, as shown in FIG. 6.

When a request for single-slot transmission is sent to the MFP 1 with respect to the currently observed channel in step S76, the MFP 1 sets to one the number of times the MFP 1 sends audio data to the cordless handset 31 when the MFP 1 makes a wireless communication with the cordless handset 31 through or using the channel in question, as shown in FIG. 6.

According to the reception-number setting processing executed in the cordless handset 31, when there is detected an external radio wave, which is emitted through or using one of the channels that are used by the cordless handset 31 to wirelessly communicate with the MFP 1, and which has a field strength equal to or larger than the predetermined threshold, it is assumed that there is a possibility that the external radio wave interferes with the wireless communication between the MFP 1 and the cordless handset 31, and the cordless handset 31 requests the MFP 1 to send audio data a number of times larger than the initial value (i.e., once), that is, twice, when the wireless communication between the MFP 1 and the cordless handset 31 is made through the channel used by the external radio wave. As a result, when the cordless handset 31 receives audio data from the MFP 1 through the channel, the audio data is received twice, in other words, two pieces of same audio data is received. Hence, even in the presence of the external radio wave that might interfere with the wireless communication between the MFP 1 and the cordless handset 31 and degrade the communication quality of the wireless communication, the communication quality is inhibited from degrading but is excellently maintained.

On the other hand, when there is detected an external radio wave, which is emitted through or using one of the channels that are used by the cordless handset 31 to wirelessly communicate with the MFP 1, and which has a field strength smaller than the predetermined threshold, it is assumed that the external radio wave does not interfere with the wireless communication between the MFP 1 and the cordless handset 31, and the cordless handset 31 requests the MFP 1 to send audio data a number of times that corresponds to the initial value (i.e., once) when the wireless communication between the MFP 1 and the cordless handset 31 is made through the channel used by the external radio wave. As a result, when the cordless handset 31 receives audio data from the MFP 1 through the channel that is free from the risk of degradation in the communication quality of the audio data communication, the audio data is received once. Hence, the number of times data is received is not unnecessarily increased but is minimized, thereby saving power.

The change or setting of the number of times the cordless handset 31 receives audio data from the MFP 1 is made in the reception-number setting processing such that the cordless handset 31 itself detects in step S72 a channel using which the wireless communication with the MFP 1 might interfere with an external radio wave, and requests the MFP 1 to increase the number of times the MFP 1 sends the cordless handset 31 audio data on the basis of the result of the detection. Hence, when there is an external radio wave that might interfere with the wireless communication between the MFP 1 and the cordless handset 31, the communication quality of the wireless communication made through the channel used by the external radio wave can be excellently maintained with stability.

With regard to the channel the wireless communication between the MFP 1 and the cordless handset 31 made using which is found by the cordless handset 31 and in step S72 to be free from the risk of interference with the external radio wave, the cordless handset 31 requests the MFP 1 to set at the initial value the number of times the MFP 1 sends audio data to the cordless handset 31 through or using the channel. Hence, the communication quality is not sacrificed for power saving.

Thus, according to the reception-number setting processing shown in FIG. 7 and executed in the cordless handset 31, the communication quality of the wireless communication between the MFP1 and the cordless handset 31 is excellently maintained while power is saved, without implementing a complex processing such as one for determining whether an error is included in every subframe.

It is noted that when a request for multi- or single-slot transmission is sent from the cordless handset 31 to the MFP 1 in the reception-number setting processing shown in FIG. 7 and executed in the cordless handset 31, a processing in the MFP 1 to change or set the number of times the MFP 1 sends audio data to the cordless handset 31 is executed in response to the request, in the similar way as in the transmission-number setting processing shown in FIG. 6 and executed in the cordless handset 31.

More specifically, the transmission-number setting processing executed by the second CPU 32 in the cordless handset 31 is illustrated in the flowchart of FIG. 6, and the above description on the transmission-number setting processing executed by the first CPU 11 in the MFP 1 applies to the transmission-number setting processing executed by the second CPU 32 in the cordless handset 31, except the following modifications made: the term "cordless handset 31" is replaced by the term "MFP 1", and vice versa, and the term "first to nth multi-transmission flags 34b1-34bn" is replaced with "first to nth multi-transmission flags 13b1-13bn".

According to the transmission-number setting processing executed by the first CPU 11 of the MFP 1, the number of times the MFP 1 sends audio data to the cordless handset 31 is changed or set in response to and in accordance with the request for multi- or single-slot transmission sent from the cordless handset 31. Thus, the number of times the MFP 1 sends audio data to the cordless handset 31 is set in the transmission-number setting processing to a number appropriate for the environment in which the cordless handset 31 is situated, thereby enabling maintenance of an excellent communication quality as well as power saving.

Figure 8A:
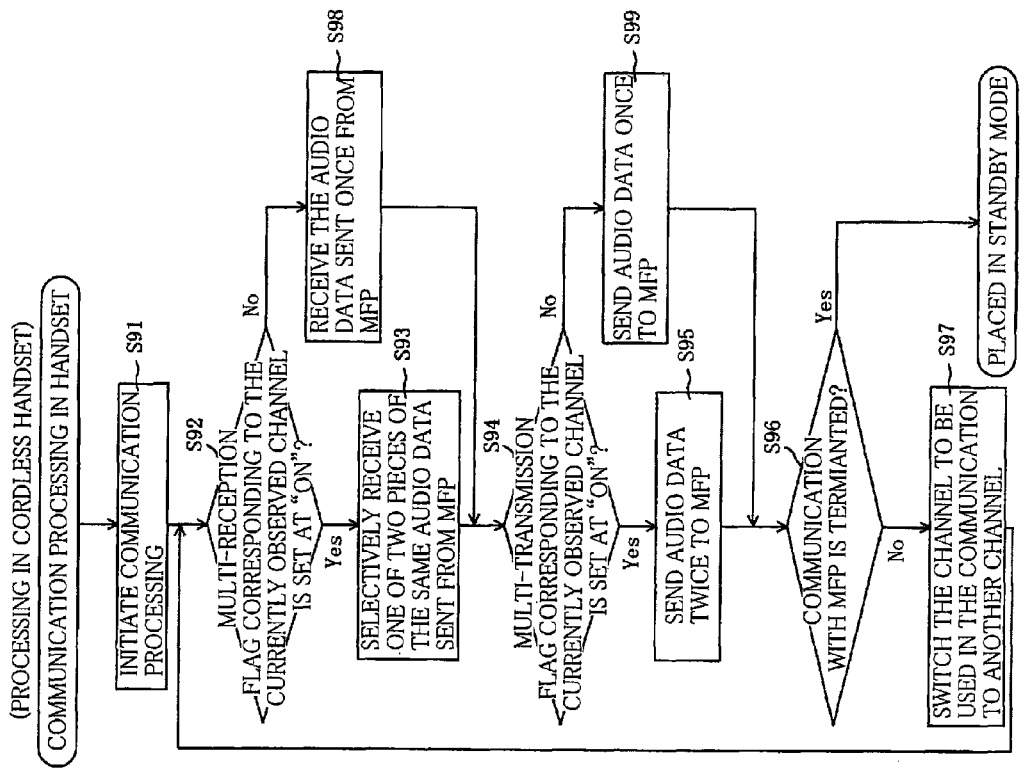
FIG. 8A is a flowchart illustrating a communication processing implemented in the MFP.
Figure 8B:
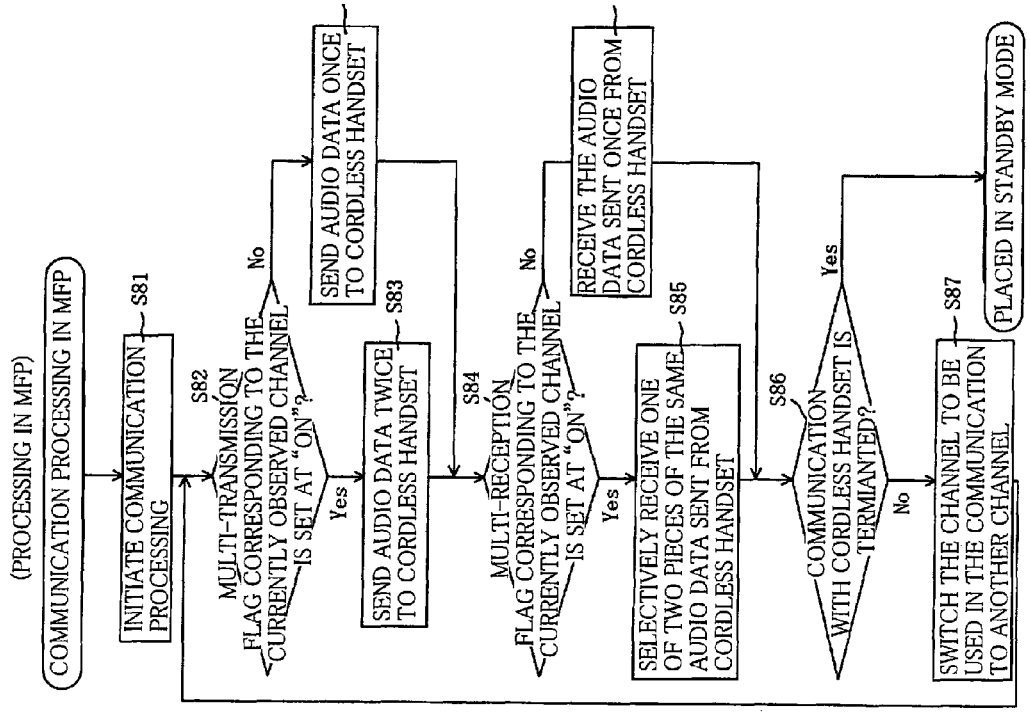
FIG. 8B is a flowchart illustrating a communication processing implemented in the cordless handset.

FIGS. 8A and 8B are flowcharts illustrating communication processings implemented in the MFP 1 and the cordless handset 31, respectively, when a wireless communication is made between the MFP 1 and the cordless handset 31 by a FHSS method. These communication processings illustrated in FIGS. 8A and 8B are executed in synchronization with each other.

The communication processing executed in the MFP 1 and illustrated in FIG. 8A is mainly implemented by the first digital-cordless-communication control portion 26, and is initiated when the cordless handset 31 sends the MFP 1 a request for initiation of a communication in response to a request for connection sent from the MFP 1 to the cordless handset 31, or when the MFP 1 sends a request for initiation of a communication to the cordless handset 31 in response to a request for connection sent from the cordless handset 31 to the MFP 1.

The request for connection is sent from the MFP 1 to the cordless handset 31 when a user at the MFP 1 makes the "off-hook" operation to place the MFP 1 in an "off-hook" state, and presses down the communication start button disposed in the manual operation portion 15 so as to initiate a speech communication with the cordless handset 31. The request for initiation of a communication is sent from the cordless handset 31 to the MFP 1, when a user at or holding the cordless handset 31 makes the "off-hook" operation to place the cordless handset 31 in an "off-hook" state, and presses the communication start button disposed in the manual operation portion 36 so as to initiate a speech communication with the MFP 1. Similarly, the request for connection is sent from the cordless handset 31 to the MFP 1 when a user at or holding the cordless handset 31 makes the "off-hook" operation to place the cordless handset 31 in the "off-hook" state, and presses down the communication start button disposed in the manual operation portion 36 so as to initiate a speech communication with the MFP 1. The request for initiation of a communication is sent from the MFP 1 to the cordless handset 31, when a user at the MFP 1 makes the "off-hook" operation to place the MFP 1 in the "off-hook" state, and presses the communication start button disposed in the first manual operation portion 15 so as to initiate a speech communication with the cordless handset 31.

The present communication processing in the MFP 1 begins with step S81, in which initial settings of a wireless communication by the FHSS method are made, and it is started to convert an analog audio signal inputted from the base handset 24 into digital audio data and sequentially record the digital audio data to a transmission buffer (not shown) in the first RAM 13, and to sequentially record digital audio data received from the cordless handset 31 to a reception buffer (not shown) in the first RAM 13.

In the following step S82, it is referred to whether the current value of the multi-transmission flag 13b for the channel currently in question (i.e., one of the first to nth multi-transmission flags 13b1-13bn) is "ON". When the value of the multi-transmission flag 13b is "ON", an affirmative decision (YES) is made in step S82, and the processing flow goes to step S83 to twice send audio data from the transmission buffer to the cordless handset 31.

On the other hand, when it is determined in step S82 that the value of the multi-transmission flag 13b referred to is "OFF", that is, when a negative decision (NO) is made in step S82, the processing flow goes to step S88 to once send audio data from the transmission buffer to the cordless handset 31.

After either of steps S83 and S88, the processing flow goes to step S84 in which it is referred to whether the current value of the multi-reception flag 13a for the channel currently in question (i.e., one of the first to nth multi-reception flags 13a1-3an) is "ON". When the value of the multi-reception flag 13a is "ON", an affirmative decision (YES) is made in step S84, and the processing flow goes to step S85 to twice receive the same audio data from the cordless handset 31 through the channel currently in question, record the two data pieces of the same audio data to the reception buffer, and select a non-erroneous one of the two data pieces, which selected one is converted into an analog audio signal which is outputted from the base handset 24.

On the other hand, when the value of the multi-reception flag 13a is "OFF", a negative decision (NO) is made in step S84, and the processing flow goes to step S89 to only once receive the audio data from the cordless handset 31 through the channel currently in question, store or record the audio data in the reception buffer, and convert the stored audio data into an analog audio signal which is outputted from the base handset 24.

After either of steps S85 and S89, the processing flow goes to step S86 to determine whether the communication with the cordless handset 31 is terminated. When it is determined in step S86 that the communication with the cordless handset 31 is not terminated yet, that is, when a negative decision (NO) is made, the processing flow goes to step S87 in which the channel used for the communication is updated or changed to another channel, and then goes back to step S82. On the other hand, when it is determined in step S86 that the communication with the cordless hand set 31 is terminated, that is, when an affirmative decision (YES) is made, the processing flow of this cycle is terminated and the MFP 1 is placed in a standby mode.

The communication processing at the cordless handset 31 shown in FIG. 8B is implemented mainly by the second digital-cordless-communication control portion 39. Similar to the above-described communication processing at the MFP 1, this processing is activated when the cordless handset 31 sends a request for initiation of a communication to the MFP 1 in response to a request for connection received from the MFP 1, or when the MFP 1 sends a request for initiation of a communication to the cordless handset 31 in response to a request for connection received from the cordless handset 31.

The present communication processing in the cordless handset 31 begins with step S91, in which initial settings of a wireless communication by the FHSS method are made, and it is started to convert an analog audio signal inputted from the microphone connected with the transceiver circuit 38 into digital audio data and sequentially record the digital audio data in a transmission buffer (not shown) in the RAM 34, and to sequentially record digital audio data received from the MFP 1 to a reception buffer (not shown) in the RAM 34.

In the following step S92, it is referred to whether the current value of the multi-reception flag 34a for the channel currently in question (i.e., one of the first to nth multi-reception flags 34a1-34an) is "ON". When the value of the multi-reception flag 34a is "ON", an affirmative decision (YES) is made in step S92, and the processing flow goes to step S93 to twice receive same audio data, in other words, receive two pieces of same audio data, from the MFP 1 through the channel currently in question, record the two data pieces of the same audio data to the reception buffer, and select a non-erroneous one of the two data pieces, which selected one is converted into an analog audio signal which is outputted from the speaker connected with the transceiver circuit 38.

On the other hand, when it is determined in step S92 that the value of the multi-reception flag 34a referred to is "OFF", that is, when a negative decision (NO) is made in step S92, the processing flow goes to step S98 to convert audio data sent from the MFP only once through the channel in question and stored in the reception buffer, into an analog audio signal which is outputted from the speaker connected with the transceiver circuit 38.

After either of steps S93 and S98, the processing flow goes to step S94 in which it is referred to whether the current value of the multi-transmission flag 34b for the channel currently in question (i.e., one of the first to nth multi-transmission flags 34b1-34bn) is "ON". When the value of the multi-transmission flag 34b is "ON", an affirmative decision (YES) is made, and the processing flow goes to step S95 to twice send same audio data from the transmission buffer to the MFP 1 through the channel currently in question.

On the other hand, when the value of the multi-transmission flag 34b is "OFF", a negative decision (NO) is made in step S94, and the processing flow goes to step S99 to only once send audio data from the transmission buffer to the MFP 1 through the channel in question.

After either of steps S95 and S99, the processing flow goes to step S96 to determine whether the communication with the MFP 1 is terminated. When it is determined in step S96 that the communication with the MFP 1 is not terminated yet, that is, when a negative decision (NO) is made in step S96, the processing flow goes to step S97 in which the channel used for the communication is updated or changed to another channel, and then goes back to step S92. On the other hand, when it is determined in step S96 that the communication with the MFP 1 is terminated, that is, when an affirmative decision (YES) is made in step S96, the processing flow of this cycle is terminated and the cordless handset 31 is placed in a standby mode.

As described above, each of the values of the one of the first to nth multi-reception flags 13a1-13an and the one of the first to nth multi-transmission flags 13b1-13bn of the MFP 1, and the one of the first to nth multi-reception flags 34a1-34an and the one of the first to nth multi-transmission flags 34b1-34bn of the cordless handset 31, is appropriately set at one of "ON" and "OFF" depending on the environments in which the MFP 1 and the cordless handset 31 are respectively situated, before the channel corresponding the flags is used for the wireless speech communication. Hence, in the communication system according to the embodiment which includes the MFP 1 and the cordless handset 31 can maintain an excellent quality of the received audio as well as save power.

As described above, when the field strength of an external radio wave received by the MFP 1 or the cordless handset 31 as a communication apparatus is equal to or larger than the predetermined threshold, the MFP 1 or the cordless handset 31 determines that there is a possibility that the external radio wave interferes with the communication made by the MFP 1 or the cordless handset 31 and degrades the quality of the communication, and thus sends a request for multi-slot communication to the other of the cordless handset 31 and the MFP 1 as another communication apparatus so as to receive audio data a number of times that is larger than the initial value, which is twice in the present embodiment, when a channel that overlaps a frequency band or channel used by the external radio wave is used for the communication made by the MFP 1 or the cordless handset 31. Thus, it is enabled to excellently maintain the quality of the audio wirelessly received in the speech communication made through or using the frequency band used by the external radio wave having the field strength equal to or larger than the threshold.

On the other hand, when the field strength of the received external radio wave is smaller than the threshold, the MFP 1 or the cordless handset 31 determines that there is not the possibility that the communication quality degrades due to interference with the external radio wave, and sends the other communication apparatus, i.e., the other of the MFP 1 and the cordless handset 31, a request for single-slot transmission so as to receive audio data a number of times that corresponds to the initial value, which is once in this embodiment, when a channel that overlaps the frequency band used by the external radio wave is used for the communication with the other of the MFP 1 and the cordless handset 31. In this case, where a request for multi-slot transmission, which requests to twice send audio data in this embodiment, is already sent, that is, where the number of times audio data is to be sent from the other of the MFP 1 and the cordless handset 31 is already set at two, the number of times audio data is to be sent from the other of the MFP 1 and the cordless handset 31 is restored from two to the initial value, i.e., one, in response to the request for single-slot transmission. Thus, the number of times audio data is to be received through a channel free from the risk of degradation in the communication quality due to interference by the external radio wave is not unnecessarily increased, thereby saving power.

In the MFP 1, the first digital-cordless-communication control portion 26 implementing the wireless communication through the digital cordless telephone system, and the wireless LAN communication control portion 18 implementing the wireless communication through the wireless LAN (i.e., wireless LAN communication) which might interfere with the former communication made through the digital cordless telephone system, are both accommodated in a single housing, i.e., the main housing 2. Hence, the MFP 1 sends the cordless handset 31 a request for multi-slot transmission with respect to all the channels in order that audio data is received a number of times larger than the initial value (that is twice in this embodiment) through each of the channels while the wireless communication through the wireless LAN is being made. Thus, even in the environment where the communication quality of the communication with the cordless handset 31 might degrade due to interference with the wireless LAN communication, an excellent quality of the audio communicated between the MFP 1 and the cordless handset 31 through the digital cordless telephone system is excellently maintained.

In particular, since the information communicated between the wireless communication between the MFP 1 and the cordless handset 31 is audio data communicated through a digital cordless telephone system, the embodiment can enjoy an effect that even in the presence of an external radio wave having a relatively high field strength, or even while the wireless LAN communication control portion 18 is making a wireless LAN communication, the quality of the received and played audio does not degrade but is maintained excellently.

Since the wireless communication between the MFP 1 and the cordless handset 31 is made by a FSHH method, the number of times audio data is to be sent from one of the MFP 1 and the cordless handset 31 to the other thereof is increased from the initial value with respect to only a part of the channels that might be subjected to interference with an external radio wave. With respect to the rest of the channels, that is, the channel or channels that is/are determined to not be subjected to interference by an external radio wave, the number of times audio data is to be sent from the other of the MFP 1 and the cordless handset 31 is set at the initial value, or is not unnecessarily increased but is minimized, thereby saving power. Thus, the embodiment enjoys an effect that in a wireless communication using the FHSS method that allows for high level of voice privacy, an excellent communication quality is maintained while saving power during the communication.

The reception-number setting processings executed in the MFP 1 and the cordless handset 31 and illustrated in FIGS. 5 and 7, respectively, and the transmission-number setting processings executed in the MFP 1 and the cordless handset 31 and described above with reference to FIG. 6, are implemented repeatedly and continuously while the MFP 1 and the cordless handset 31 are on. Hence, irrespective of whether the MFP 1 and the cordless handset 31 are communicating with each other or in a standby mode waiting for initiation of a speech communication, a recognition on the environments in which the MFP 1 and the cordless handset 31 are respectively situated in is kept refreshed. Thus, before a communication is made, the number of times the audio data is to be sent and received through each channel can be appropriately determined in accordance with the recognition, thereby enabling to maintain with stability an excellent communication quality.

Although there has been described one embodiment of the invention, it is to be understood that the invention is not limited to the details of the embodiment, but may be otherwise embodied with various modifications and improvements that may occur to those skilled in the art, without departing from the scope and spirit of the invention defined in the appended claims.

For instance, although the MFP 1 and the cordless handset 31 as a base unit and a cordless unit of a digital cordless telephone system have been described above as communication apparatuses wirelessly communicating audio data, the invention is also applicable to a radio apparatus such as transceiver.

In the above-described embodiment, the number of times to send and receive data, which is set at one of the initial value and a number larger than the initial value, is that of communication between a base unit (i.e., the MFP 1) and a cordless handset (i.e., the cordless handset 31) of a digital cordless telephone system for wirelessly communicating audio data. However, application of the invention is not limited thereto, but the invention is equally applicable to a communication apparatus for making a wireless communication by other communication methods such as wireless LAN communication.

In the above-described embodiment, the MFP 1 and the cordless handset 31 of a digital cordless telephone system wirelessly communicate with each other by a FHSS method. However, the invention is applicable to a case where the wireless communication between the MFP 1 and the cordless handset 31 is made such that the channel used in the communication is fixed to a single channel.

In the above-described embodiment the initial and increased values of the number of times data is sent and received are one and two, respectively. However, these numbers are given by way of example, and may be predetermined to any other numbers as long as the increased number is larger than the initial value.

Although in the above-described embodiment the access point 51 is employed as an apparatus making a wireless communication with the MFP 1 through a wireless LAN, other wireless LAN apparatuses, such as wireless LAN printer, may be employed in place of the access point 51, as long as the wireless LAN apparatus can wirelessly communicate with the MFP through a wireless LAN.

What is claimed is:

1. A communication apparatus which wirelessly communicates information with a first other communication apparatus by a first communication method and using a second frequency band which is at least partially overlapping a first frequency band usable according to the first communication method, the communication apparatus comprising:
   a first communicator configured to implement the wireless information communication with the first other communication apparatus by the first communication method;
   a second communicator configured to implement the wireless information communication with a second other communication apparatus, which is different from the first other communication apparatus, by a second communication method according to which the second frequency band is usable;
   a judging portion configured to judge whether a communication by the second communicator is being made;
   a first field-strength measuring portion configured to measure, when the judging portion has judged the communication by the second communicator is not being made, the field strength of an external radio wave in the second frequency band, the external radio wave being transmitted from an external communication apparatus other than the first other communication apparatus;
   a first transmitting-number-of-times setter configured to set a transmitting number, the transmitting number being the number of times that the same information is transmitted from the first other communication apparatus to the communication apparatus in the second frequency band, wherein the first transmitting-number-of-times setter sets the transmitting number to a first value which is more than a second value when the judging portion has judged the communication by the second communicator being made, and wherein the first transmitting-number-of-times setter sets the transmitting number to the first value when the field-strength of the external radio wave in the second frequency band measured by the first field-strength measuring portion is greater than or equal to a predetermined threshold, and the first transmitting-number-of-times setter sets the transmitting number to the second value when the field-strength of the external radio wave in the second frequency band measured by the first field-strength measuring portion is less than the predetermined threshold;
   a first request-sender configured to send a request to the first other communication apparatus for the first other communication apparatus to transmit the same information to the communication apparatus by the number of times of the transmitting number;
   a first receiving-number-of-times setter configured to set a receiving number, the receiving number being the number of times that the same information is received from the first other communication apparatus by the communication apparatus in the second frequency band, the first receiving-number-of-times setter setting the receiving number to the first value when the judging portion has judged the communication by the second communicator is being made and when the field-strength of the external radio wave in the second frequency band measured by the first field-strength measuring portion is greater than or equal to the predetermined threshold, and the first receiving-number-of-times setter sets the receiving number to the second value when the field-strength of the external radio wave in the second frequency band measured by the first field-strength measuring portion is less than the predetermined threshold;
   a receiver configured to receive the same information from the first other communication apparatus by the number of times of the receiving number set by the first receiving-number-of-times setter,
   wherein the first request-sender is configured to send the request before the first other communication apparatus transmits the same information to the communication apparatus in the second frequency band,
   wherein the first receiving-number-of-times setter is configured to set the receiving number before the first other communication apparatus transmits the same information to the communication apparatus in the second frequency band; and
   wherein the first transmitting-number-of-times setter sets the first value when the judging portion has judged the communication by the second communicator is being made, without measuring of the field strength by the first field strength measuring portion.

2. The communication apparatus according to claim 1, wherein the second frequency band is included in the first frequency band.

3. The communication apparatus according to claim 1, wherein the same information that the first communicator communicates is audio data.

4. The communication apparatus according to claim 1, wherein the first communication method by which the wireless information communication is made is a frequency hopping spread spectrum method according to which a plurality of frequency channels having respective center frequencies and defined within the first frequency band are used as the second frequency band.

5. The communication apparatus according to claim 1, wherein the same information that the first communicator communicates is audio data, and the information that the second communicator communicates is general data.

6. The communication apparatus according to claim 5, wherein the first other communication apparatus with which the first communicator implements the wireless information communication is a cordless handset of a digital cordless telephone system, and the second other communication apparatus with which the second communicator makes the wireless information communication is a wireless LAN apparatus.

7. A communication system comprising the communication apparatus according to claim 1 and the first other communication apparatus, wherein
   the first other communication apparatus includes a transmitter configured to transmit information to the communication apparatus by the first communication method, and
   the transmitter is configured to transmit the same information by the number of times of the transmitting number set by the transmitting-number-of-times setter after the first other communication apparatus receives the request for the first other communication apparatus to transmit the same information to the communication apparatus by the number of times of the transmitting number.

8. A communication system comprising the communication apparatus according to claim 1 and the first other communication apparatus, wherein
   the first other communication apparatus includes a transmitter configured to transmit information to the communication apparatus by the first communication method, and
   the transmitter is configured to transmit the same information by the number of times of the transmitting number set by the transmitting-number-of-times setter after the first other communication apparatus receives the request for the first other communication apparatus to transmit the same information to the communication apparatus by the number of times of the transmitting number.

9. A communication system according to claim 7, wherein the first other communication apparatus includes:
- a second field-strength measuring portion configured to measure the field strength of an external radio wave in the second frequency band, the external radio wave being transmitted from an external communication apparatus other than the communication apparatus;
- a second transmitting-number-of-times setter configured to set the transmitting number, the transmitting number being the number of times that the same information is transmitted from the communication apparatus to the first other communication apparatus in the second frequency band, the second transmitting-number-of-times setter setting the transmitting number to a third value when the field-strength of the external radio wave in the second frequency band measured by the second field-strength measuring portion is greater than or equal to the predetermined threshold, and the second transmitting-number-of-times setter setting the transmitting number to a forth value which is less than the third value when the field-strength of the external radio wave in the second frequency band measured by the second field-strength measuring portion is less than the predetermined threshold;
- a second request-sender configured to send a request to the communication apparatus for the communication apparatus to transmit the same information to the first other communication apparatus by the number of times of the transmitting number;
- a second receiving-number-of-times setter configured to set the receiving number, the receiving number being the number of times that the same information is transmitted from the communication apparatus to the first other communication apparatus in the second frequency band, the second receiving-number-of-times setter setting the receiving number to the third value when the field-strength of the external radio wave in the second frequency band measured by the second field-strength measuring portion is greater than or equal to the predetermined threshold, and the second receiving-number-of-times setter setting the receiving number to the forth value when the field-strength of the external radio wave in the second frequency band measured by the second field-strength measuring portion is less than the predetermined threshold, wherein the second request-sender is configured to send the request before the communication apparatus transmits the same information to the first other communication apparatus in the second frequency band, and wherein the second receiving-number-of-times setter is configured to set the receiving number before the communication apparatus transmits the same information to the first other communication apparatus in the second frequency band.

10. The communication apparatus according to claim 1, wherein the receiver is configured to receive a plurality of data pieces of the same information where the first receiving-number-of-times setter sets the receiving number to the first value in the second frequency band and to select one of the plurality of data pieces as a non-erroneous data piece.

* * * * *